US012320998B2

(12) United States Patent
Kolle et al.

(10) Patent No.: US 12,320,998 B2
(45) Date of Patent: Jun. 3, 2025

(54) DEFORMABLE PHOTONIC MATERIALS AND RELATED METHODS

(71) Applicant: Massachusetts Institute of Technology, Cambridge, MA (US)

(72) Inventors: Mathias Kolle, Hull, MA (US); Benjamin Miller, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/545,117

(22) Filed: Dec. 19, 2023

(65) Prior Publication Data

US 2024/0118472 A1 Apr. 11, 2024

Related U.S. Application Data

(63) Continuation of application No. 17/473,255, filed on Sep. 13, 2021, now Pat. No. 11,892,668.

(60) Provisional application No. 63/113,241, filed on Nov. 13, 2020.

(51) Int. Cl.
*G02B 5/28* (2006.01)
*G02B 1/00* (2006.01)

(52) U.S. Cl.
CPC ............ *G02B 5/287* (2013.01); *G02B 1/005* (2013.01)

(58) Field of Classification Search
CPC .... G02B 26/007; G02B 26/001; G02B 1/005; G02B 5/287
See application file for complete search history.

(56) References Cited

U.S. PATENT DOCUMENTS

| 6,124,912 | A | 9/2000 | Moore | |
|---|---|---|---|---|
| 10,345,278 | B2 | 7/2019 | Wang et al. | |
| 11,892,668 | B2 | 2/2024 | Kolle et al. | |
| 2010/0150511 | A1* | 6/2010 | Arsenault | G02B 6/1225 522/182 |
| 2010/0253061 | A1* | 10/2010 | Whiteman | B42D 25/23 283/85 |
| 2010/0298515 | A1 | 11/2010 | Marchand et al. | |
| 2011/0205617 | A1* | 8/2011 | Iizuka | B82Y 20/00 359/322 |
| 2011/0233476 | A1 | 9/2011 | Arsenault | |
| 2011/0242638 | A1* | 10/2011 | Horning | G02B 1/005 359/290 |
| 2011/0247676 | A1 | 10/2011 | Grossman et al. | |
| 2012/0161431 | A1* | 6/2012 | Vulpius | B29C 55/065 156/196 |
| 2013/0258445 | A1 | 10/2013 | Arsenault | |
| 2013/0328102 | A1 | 12/2013 | Peng et al. | |
| 2014/0205797 | A1 | 7/2014 | Kaplan et al. | |
| 2014/0277294 | A1 | 9/2014 | Jones et al. | |

(Continued)

FOREIGN PATENT DOCUMENTS

JP 2004262151 A * 9/2004

OTHER PUBLICATIONS

Akao, English translation for JP-2004262151-A (Year: 2004).*

(Continued)

*Primary Examiner* — Jonathan Y Jung
(74) *Attorney, Agent, or Firm* — Wolf, Greenfield & Sacks, P.C.

(57) ABSTRACT

The present disclosure describes photonic materials that reversibly change color in response to the material being stretched or otherwise mechanically deformed.

21 Claims, 11 Drawing Sheets

(56) References Cited

U.S. PATENT DOCUMENTS

| | | |
|---|---|---|
| 2016/0258949 A1 | 9/2016 | Miller et al. |
| 2019/0243062 A1 | 8/2019 | Fok et al. |
| 2020/0255565 A1 | 8/2020 | Jung et al. |
| 2020/0400581 A1* | 12/2020 | Jiang .................. C08J 9/26 |

OTHER PUBLICATIONS

Yetisen et al. (Adv. Opt. Mater. 2, 250 (2014) (Year: 2014).*

International Search Report and Written Opinion for International Application No. PCT/US2021/050047, mailed Dec. 30, 2021.

International Preliminary Report on Patentability for International Application No. PCT/US2021/050047, mailed Jan. 27, 2025.

Aguirre et al., Tunable Colors in Opals and Inverse Opal Photonic Crystals. Advanced Functional Materials. Aug. 23, 2010;20(16):2565-78. Epub Jul. 20, 2010.

Arsenault et al., From colour fingerprinting to the control of photoluminescence in elastic photonic crystals. Nature Materials. 2006;5:179-84. Epub Feb. 19, 2006.

Baechler et al., Shedding light on 19th century spectra by analyzing Lippmann photography. PNAS. 2021;118(17):e2008819118. 7 pages.

Blyth et al., A diffusion method for making silver bromide based holographic recording material. The Imaging Science Journal. 1999;47(2):87-91.

Chan et al., Block Copolymer Photonic Gel for Mechanochromic Sensing. Advanced Materials. Oct. 25, 2011;23(40):4702-6. Epub Sep. 19, 2011.

Cho et al., Elastoplastic Inverse Opals as Power-Free Mechanochromic Sensors for Force Recording. Advanced Functional Materials. Oct. 14, 2015;25(38):6041-9. Epub Aug. 26, 2015.

Cierpka et al., Flow visualization by mobile phone cameras. Experiments in Fluids. 2016;57:108. Epub Jun. 9, 2016. 10 pages.

Cody et al., Self-processing photopolymer materials for versatile design and fabrication of holographic sensors and interactive holograms. Appl Opt. Aug. 1, 2018;57(22):E173-E183. doi: 10.1364/AO.57.00E173.

Finlayson et al., Ordering in stretch-tunable polymeric opal fibers. Optics Express. Feb. 2011;19(4):3144-54.

Finlayson et al., Polymer opals as novel photonic materials. Polymer International. Oct. 2013;62(10):1403-7. Epub Jul. 2, 2013.

Fu et al., Bioinspired living structural color hydrogels. Science Robotics. Mar. 28, 2018;3(16):eaar8580. 8 pages.

Fudouzi et al., Photonic rubber sheets with tunable color by elastic deformation. Langmuir. Jan. 31, 2006;22(3):1365-8. doi: 10.1021/la0521037. Epub Dec. 20, 2005.

Haque et al., Rapid and Reversible Tuning of Structural Color of a Hydrogel over the Entire Visible Spectrum by Mechanical Stimulation. Chem. Mater. 2011;2(23):5200-7. Epub Nov. 11, 2011.

Isapour et al., Bioinspired Stimuli-Responsive Color-Changing Systems. Advanced Materials. May 10, 2018;30(19):1707069. Epub Apr. 26, 2018. 36 pages.

Jia et al., Highly Sensitive Mechanochromic Photonic Hydrogels with Fast Reversibility and Mechanical Stability. Langmuir. 2015;31(31):8732-7. Epub Jul. 20, 2015.

Kang et al., Printable and Rewritable Full Block Copolymer Structural Color. Advanced Materials. Aug. 4, 2017;29(29):1700084. Epub May 26, 2017. 8 pages.

Kim et al., Silk inverse opals. Nature Photonics. 2012;6:818-23. Epub Nov. 11, 2012.

Kim et al., Structural colour printing using a magnetically tunable and lithographically fixable photonic crystal. Nat. Photonics. 2009;3:534-40. Epub Aug. 23, 2009.

Kolle et al., Progress and Opportunities in Soft Photonics and Biologically Inspired Optics. Advanced Materials. Jan. 11, 2018;30(2):1702669. Epub Oct. 23, 2017. 40 pages.

Lee et al., Chameleon-Inspired Mechanochromic Photonic Films Composed of Non-Close-Packed Colloidal Arrays. ACS Nano. Nov. 28, 2017;11(11):11350-11357. doi: 10.1021/acsnano.7b05885. Epub Nov. 8, 2017.

Lee et al., Reconfigurable Reflective Colors in Holographically Patterned Liquid Crystal Gels. ACS Photonics. 2020;7(8):1978-82. Epub Jun. 30, 2020.

Liang et al., Roll-to-roll fabrication of touch-responsive cellulose photonic laminates. Nature Communications. 2018;9:4632. Epub Nov. 6, 2018. 7 pages.

Lippmann, La photographie des couleurs. Comptes Rendus Hebdomadaires des Séances de l'Académie des Sciences. Feb. 2, 1891;112(5):274-5.

Lippmann, Sur la théorie de la photographie des couleurs simples et composées par la méthode interferentielle. J. Phys. Theor. Appl. 1894;3(1):97-107.

Liu et al., Structural color three-dimensional printing by shrinking photonic crystals. Nature Communications. 2019;10:4340. Epub Sep. 25, 2019. 8 pages.

McDougal et al., Biological growth and synthetic fabrication of structurally colored materials. Journal of Optics. Jun. 11, 2019;21(7):073001. 51 pages.

McKay et al., Visualization of blood cell contrast in nailfold capillaries with high-speed reverse lens mobile phone microscopy. Biomed Opt Express. Mar. 30, 2020;11(4):2268-2276. doi: 10.1364/BOE.382376. Epub Apr. 1, 2020.

Naydenova et al., A visual indication of environmental humidity using a color changing hologram recorded in a self-developing photopolymer. Appl. Phys. Lett. 2008;92:031109. Epub Jan. 23, 2008. 3 pages.

Ozin et al., P-Ink and Elast-Ink from lab to market. Materials Today. Jul.-Aug. 2008;11(7-8):44-51. Epub Jun. 20, 2008.

Phillips et al., A colloidoscope of colloid-based porous materials and their uses. Chemical Society Reviews. 2016;45:281-322. Epub Sep. 23, 2015.

Pursiainen et al., Shear-Induced Organization in Flexible Polymer Opals. Advanced Materials. Apr. 21, 2008;20(8):1484-7. Epub Apr. 21, 2008.

Ruhl et al., Colloidal Crystals in Latex Films: Rubbery Opals. Macromolecular Chemistry and Physics. Dec. 2001;202(18):3502-5. Epub Dec. 18, 2001.

Sandt et al., Stretchable Optomechanical Fiber Sensors for Pressure Determination in Compressive Medical Textiles. Advanced Healthcare Materials. Aug. 8, 2018;7(15):1800293. Epub May 29, 2018. 7 pages.

Tan et al., Direct-Write Freeform Colloidal Assembly. Advanced Materials. Nov. 2, 2018;30(44):1803620. Epub Aug. 30, 2018. 7 pages.

Wang et al., Light-activated shape morphing and light-tracking materials using biopolymer-based programmable photonic nanostructures. Nature Communications. 2021; 12:1651. Epub Mar. 12, 2021. 9 pages.

Yetisen et al., Light-Directed Writing of Chemically Tunable Narrow-Band Holographic Sensors. Advanced Optical Materials. Mar. 2014;2(3):250-4. Epub Jan. 2, 2014.

Yue et al., Tunable one-dimensional photonic crystals from soft materials. Journal of Photochemistry and Photobiology C: Photochemistry Reviews. Jun. 2015;23:45-67. Epub May 5, 2015.

Zhang et al., Super-Elastic Magnetic Structural Color Hydrogels. Small. Aug. 28, 2019;15(35): 1902198. Epub Jul. 11, 2019. 6 pages.

Zhao et al., Bio-inspired variable structural color materials. Chemical Society Reviews. 2012;41:3297-317. Epub Feb. 3, 2012.

Zhao et al., Large-scale ordering of nanoparticles using viscoelastic shear processing. Nature Communications. 2016;7:11661. Epub Jun. 3, 2016. 10 pages.

Extended European Search Report mailed Nov. 15, 2024, for Application No. EP21892518.8.

Gibbons et al., Stretch-tuneable dielectric mirrors and microcavities. IEEE Explore. May 2010; 2 pages.

Muhammad et al., Advances in hydrogel photonics and their applications. APL Photon. Am Inst Phys. Dec. 2019; 4(12): 11 pages.

Ryabchun et al., Novel effective approach for the fabrication of PDMS-based elastic volume gratings. Adv. Optic Mater. Sep. 2015; 4(1): 169-76.

* cited by examiner

DEFORMABLE PHOTONIC MATERIALS AND RELATED METHODS

RELATED APPLICATIONS

This application is a continuation of U.S. patent application Ser. No. 17/473,255, filed Sep. 13, 2021, and entitled "DEFORMABLE PHOTONIC MATERIALS AND RELATED METHODS", which claims priority under 35 U.S.C. § 119(e) to U.S. Provisional Application No. 63/113,241, filed Nov. 13, 2020, and entitled "SCALABLE OPTICAL MANUFACTURE OF DEFORMABLE, COLOR-CHANGING PHOTONIC MATERIALS," the contents of each of which are incorporated herein by reference in its entirety for all purposes.

GOVERNMENT SPONSORSHIP

This invention was made with government support under DMR1922321 awarded by the National Science Foundation. The government has certain rights in the invention.

TECHNICAL FIELD

Stretchable, color-responsive photonic materials and related methods are generally described.

BACKGROUND

Micro- and nano-structured material morphologies with dynamic optical properties may be suited for optical sensing and visual information transfer. However, one impediment to pervasive utilization of such dynamic optical materials is the lack of scalable manufacturing strategies. Controlling the nano-scale morphology across macro-scale areas of the material with adequate spatial control of its reflection spectrum and light scattering characteristics has proven to be a formidable challenge. Accordingly, improved articles, materials, and methods are desired.

SUMMARY

Deformable photonic materials and related methods are described. The subject matter of the present disclosure involves, in some cases, interrelated products, alternative solutions to a particular problem, and/or a plurality of different uses of one or more systems and/or articles.

In one aspect, a photonic material comprising a photopolymer layer and a backing layer adjacent to the photopolymer layer is described wherein the photonic material exhibits reversible color variation under applied mechanical strain. In some embodiments, the photonic material further comprises a reflection layer associated with the photopolymer layer. In some embodiments, the photopolymer layer comprises a photo-responsive elastomer.

In another aspect, a photonic material comprising a photopolymer layer comprising a photo-responsive elastomer optically patterned with nanoscale refractive index variations is described, wherein the photonic material is deformable and wherein the photonic material exhibits reversible color variation under applied mechanical strain. In some embodiments, the photonic material further comprises a backing layer adjacent to the photopolymer layer.

In another aspect, a photonic material comprising a photopolymer layer comprising a photo-responsive elastomer, and a reflection layer having textured surface is described, wherein the photopolymer layer is deformable.

In another aspect, a wearable article is described comprising a photonic material comprising a photopolymer layer, wherein the photonic material exhibits reversible color variation under applied mechanical strain.

In another aspect, a method for making a photonic material is described, the method comprising applying light to a photopolymer layer comprising a photo-responsive elastomer and associated with a reflection layer having a textured surface forming nanoscale refractive index variations in the photo-responsive elastomer; and removing the photopolymer layer from the reflection layer.

In another aspect a method for exhibiting color variation in a photonic material is described, the method comprising exposing the photonic material to incident light, wherein the photonic material comprises a photopolymer layer comprising a photo-responsive elastomer patterned with nanoscale refractive index variations; reflecting light from a first position the photonic material of a first wavelength; deforming the photonic material; and reflecting light from the first position of the photonic material at a second wavelength different than the first wavelength.

In some cases, a manufacturing approach for large area photonic sheets with a rich and easily controlled design space of spatial color patterns, spectral signatures, angular scattering characteristics, and response to mechanical stimuli are described. In some instances, a standard projector may be used along with a photosensitive elastomer, and a reflective surface. In some such instances, this approach is easily and cost-efficiently implemented in industrial settings, at-home manufacturing, or educational laboratories. In some cases, devices for touch-sensing in augmented reality devices and machine-assisted object manipulation may be described, as well as mechano-sensitive healthcare materials, which may lead to a wealth of potential new applications that capitalize on information transfer with dynamic structural colors. Other applications are possible.

Other advantages and novel features of the present disclosure will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
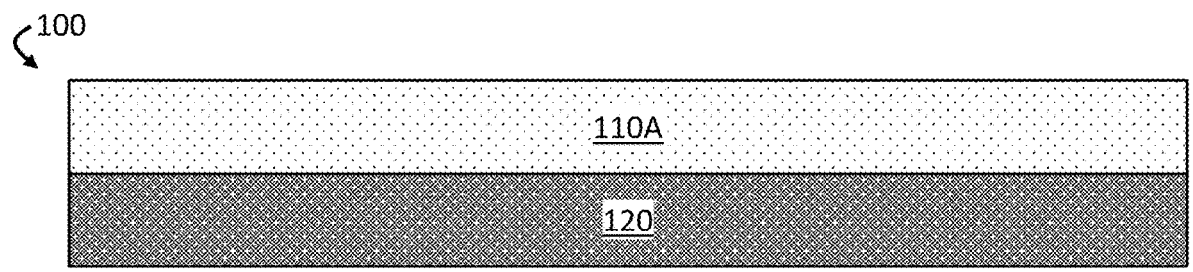
FIG. 1A is schematic cross-sectional side view of a photonic material comprising a photopolymer layer and a reflection layer adjacent to the photopolymer layer, according to some embodiments.
Figure 1B:
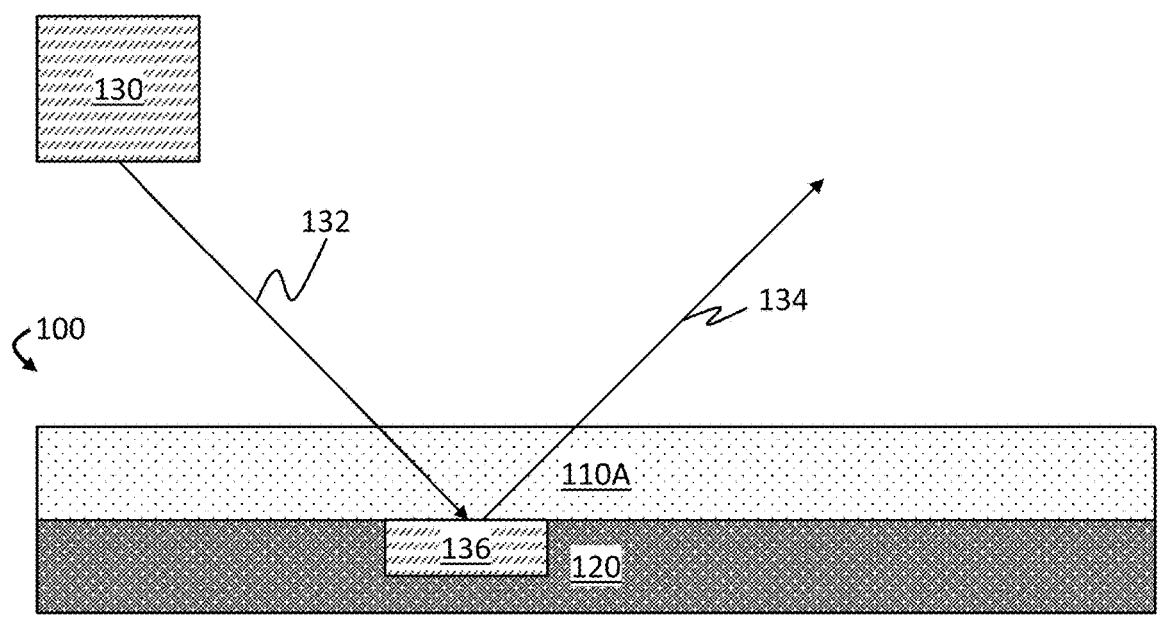
FIG. 1B is a schematic cross-sectional side view of a photonic material positioned near a light source, wherein the light source optically patterns the photopolymer layer of the photonic material, according to some embodiments.

Disclosed herein are articles, materials, and methods related to photonic materials. Photonic materials generally appear in the natural world and may be, in some cases, responsible for the many vibrant, structural colors observed in some plants and animals. Photonic materials generally harness variations of refractive indices, for example, to shape the propagation of light (e.g., reflected light) and may filter incoming light both spectrally and by modifying its direction. Thus, these materials may play an important role in modern technology, ranging from applications in LEDs, photonic-crystal fibers, and optical coatings to biosensing applications and display technology.

The photonic materials described herein may advantageously be fabricated to offer both precise optomechanical tunability and scalability. The inventive photonic materials described herein may comprise, in some embodiments, a photopolymer layer comprising a photo-responsive elastomer that may be, for example, optically patterned with refractive index variations (e.g., nanoscale refractive index variations). In some embodiments, to pattern the photo-responsive elastomer, a reflection layer may be associated with the photopolymer layer (e.g., positioned adjacent to the photopolymer layer). The reflection layer may be textured in order to tune the optical properties of the associated photopolymer layer. Light may be applied to the photopolymer layer and/or the reflection layer and may optically pattern the photo-responsive elastomer with the desired refractive index variations. The reflection layer may be removed, resulting in a photonic material that exhibits reversible color variation under applied mechanical strain or deformation (e.g., stretching). In some instances, a backing layer is positioned adjacent to the photopolymer layer, which may further tune or modulate the color variations of the photonic material. The above description is intended to be description of some embodiments of the articles and materials described here. More details regarding the photonic materials are described below.

The photonic materials described herein may be useful for a number of applications, including clothing (e.g., shirts, hats, pants, glasses), wearable electronic devices (e.g., watches, smartphones), medical devices (e.g., bandages, gauze dressings, compression stockings, prosthetic fittings including prosthetic limbs), sensors (e.g., pressure sensors, force sensors), and robotics (e.g., robotic gripping, robotic hands), as non-limiting examples. Advantageously, the articles and materials described herein may be color-changing (e.g., in response to a mechanical deformation). For example, one or more mechanical deformations may be applied to the article (or the material) such that the article and/or material is stretched, compressed, twisted, sheared, or otherwise mechanically deformed in a single direction or multiple directions. Upon application of the mechanical deformation, the material may exhibit at least one change in a color of the material. In some embodiments, the change in color is associated with the mechanical deformation. In an illustrative example, and without wishing to be bound by such, the material may undergo tensile deformation and areas of the material which are under mechanical strain have a different color than prior to the application of mechanical strain. In some embodiments, the material is useful as a pressure sensor (e.g., upon the application of pressure, the region of the material undergoing mechanical deformation by the pressure changes color relative to the color of the material prior to the application of pressure). In some embodiments, the change in color is correlated with the relative amount of mechanical deformation. In some embodiments, the change is color is not correlated (or not directly correlated) with the relative amount of mechanical deformation.

For example, in some embodiments, incident light may be reflected from a certain portion of the photopolymer layer having a first color (i.e., having a first wavelength), and, upon tensile deformation of that certain portion, light may be reflected from the photopolymer having a second color different than the first color (i.e., having a second wavelength different from. In some such embodiments, the photopolymer layer may be further mechanically deformed such that the certain portion of the photopolymer layer may reflect incident light such that the reflected light has a third color different from the first color and the second color. In some embodiments, the photopolymer layer may then be relaxed to its original configuration (i.e., to its configuration prior to applying the tensile or mechanical deformation) and incident light may be reflected from the certain portion of the photopolymer layer with the first color. In some such embodiments, the color change upon mechanical deformation and relaxation is reversible, such that the photopolymer layer may undergo one, several, or many mechanical deformations and relaxations, reflecting a particular wavelength of light related to the presence or absence of a mechanical deformation to the photopolymer layer.

By way of illustration, FIGS. 1A-1F schematically illustrate the fabrication of a stretchable, color-changing photonic material, according to some embodiments. In FIG. 1A, a photonic material 100 comprises a photopolymer layer 110A positioned on a reflection layer 120. While not shown in the figure, in some embodiments the photopolymer layer comprises a photo-responsive elastomer that is optically patterned.

In some embodiments, a source of light or electromagnetic radiation is positioned proximate the photopolymer layer and/or the reflection layer. For example, as shown in the FIG. 1B, a source of electromagnetic radiation 130 is positioned such that the photopolymer layer 110A is between the source of electromagnetic radiation 130 and the reflection layer 120.

Figure 1C:
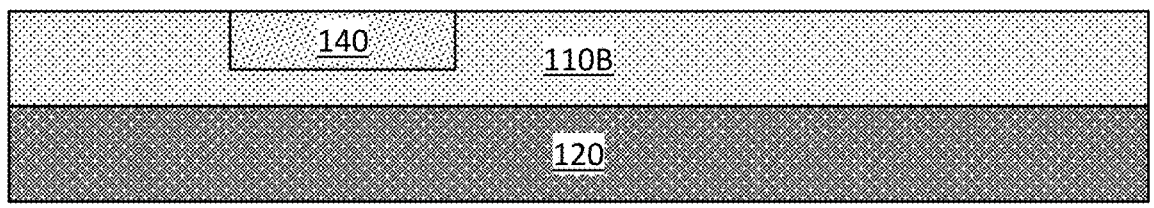
FIG. 1C is a schematic cross-sectional side view of a photonic material comprising a photopolymer layer and a reflection layer in which the photopolymer layer of the photonic material has been optically patterned and comprises an image, according to some embodiments.
Figure 1D:
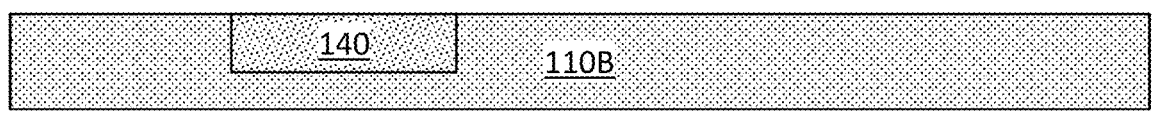
FIG. 1D is schematic cross-sectional side view of photonic material comprising a photopolymer layer in which a reflection layer is not present, according to some embodiments.
Figure 1E:
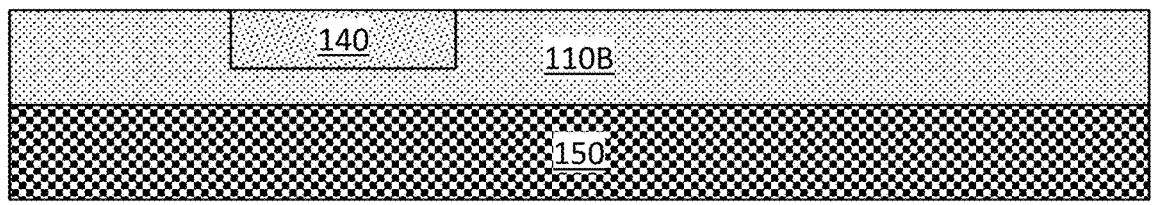
FIG. 1E is a schematic cross-sectional side view of photonic material comprising a photopolymer layer in which a backing layer has been affixed to the photopolymer layer, according to some embodiments.
Figure 1F:
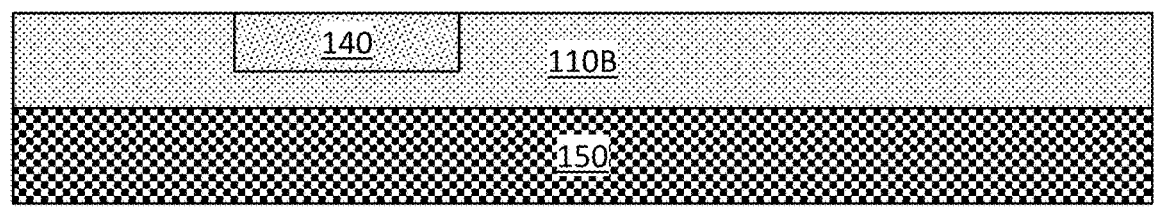
FIG. 1F is schematic diagram illustrating mechanical deformation of the photonic material, according to some embodiments.

Electromagnetic radiation (sometimes referred to as 'light' herein) may be applied to the photopolymer layer and/or the reflection layer such that a standing wave of electromagnetic radiation is generated on the reflection layer. For example, in FIG. 1B, incident light 132 pass through the photopolymer layer 110A and is reflected (i.e., reflected light 134) by the reflection layer 120 and creates a standing wave of electromagnetic radiation 136. Without wishing to be bound by theory, in some embodiments, the standing wave of electromagnetic radiation (i.e., photons of light from the standing wave) interacts (e.g., cause a reaction) within the photo-responsive elastomer of the photopolymer layer such that it optically patterns the elastomer with nanoscale refractive index variations. In some embodiments, the photopolymer layer 110A may then be polymerized (e.g., by electromagnetic radiation emanating from a source of electromagnetic radiation), forming a polymerized photopolymer layer 110B as shown in FIG. 1C, which comprises the nanoscale refractive index variations. An image 140 may also formed in the photopolymer layer 110B that matches the image projected by the source of electromagnetic radiation 130, according to some embodiments.

In some embodiments, the photonic material includes the reflection layer along with the photopolymer layer. However, in other embodiments, the reflection layer may be removed after optically patterning the photopolymer layer. For example, in FIG. 1D, the photopolymer layer 110 has been optically patterned with the nanoscale refractive index variations and the reflection layer 120 has removed relative to FIG. 1C.

In some embodiments, a backing layer may be applied to the photopolymer layer. For example, in FIG. 1E, a backing layer 150 has been applied to the photopolymer layer 110. As described in more detail elsewhere herein, the backing layer may further tune or modulate incident and/or reflected light of the photonic material. The backing layer adjacent to the photopolymer layer may also be deformed or mechanically strained along with the photopolymer layer so that any of features of the photonic material provided by the backing layer may be maintained as the photonic material is deformed or mechanically strained.

It should be understood that when a portion (e.g., a layer, a structure, a region) is "on", "adjacent", "above", "over", "overlying", or "supported by" another portion, it may be directly on the portion, or an intervening portion (e.g., layer, structure, region) may also be present. Similarly, when a portion is "below" or "underneath" another portion, it may be directly below the portion, or an intervening portion (e.g., layer, structure, region) may also be present. A portion that is "directly adjacent", "directly on", "immediately adjacent", "in contact with", or "directly supported by" another portion means that no intervening portion is present. It should also be understood that when a portion is referred to as being "on", "above", "adjacent", "over", "overlying", "in contact with", "below", or "supported by" another portion, it may cover the entire portion or a part of the portion.

Advantageously, the photonic materials described herein may be deformable and may also exhibit reversible color variation when deformed or otherwise mechanically strained, as noted above and elsewhere herein. For example, in FIG. 1F, the photonic material 100 may be stretched, as illustrated by stretching 160, or otherwise deformed or mechanically strained. Image 140 may also stretch proportionally to stretching 160, illustrated schematically by stretching 162. Additional details regarding deformation or mechanical strain are described elsewhere herein.

Various embodiments described herein may include refractive index variations (e.g., nanoscale refractive index variations) within photonic material (e.g., within the photopolymer layer of the photonic materials). For example, as mentioned above, in some embodiments, the photopolymer layer comprises a photo-responsive elastomer optically patterned with nanoscale refractive index variations. In some embodiments, the refractive index variations comprise periodic variations of some characteristic or feature (e.g., height, width, thickness, material). Without wishing to be bound by any particular theory, one or more surfaces of the periodic variations may cause a partial reflection of incident light waves (e.g., an optical wave), and for light waves whose wavelengths are relatively close to the dimensions of the variations, the reflections may combine by constructive interference, such that the periodic variations act as distributed Bragg reflectors (DBR). When the dimensions of the variations are relatively close to the wavelengths of visible light (e.g., greater than or equal to 380 nm and less than or equal to 700 nm), the variations may act as an optical waveguide by reflecting certain optical waves while not reflecting certain other optical waves. As described in more detail below, the wavelengths of light that are reflected or not reflected may be tuned by the spacings of the refracted index variations.

The refractive index variations may have any suitable size or arrangement. For example, in some embodiments, the refractive index variations comprise gratings, grooves, and/or channels. In some embodiments, the refractive index variations comprise an array (e.g., a 1-D array, a 2-D array, a 3-D array) of periodic and/or repeating features. In some embodiments, the refractive index variations comprise an array of indentations and/or protrusions within the photonic material (e.g., within the photopolymer layer, within a photo-responsive elastomer, within the reflection layer). In some embodiments, the refractive index variations comprise patterning, texturing, and/or roughening of a surface of the photonic material. Those skilled in the art in view of the present disclosure will be capable of selecting suitable sizes and arrangements of the refractive index variations.

The refractive index variations may have a regular or periodic characteristic dimension (e.g., a spacing between each variation, a period of the refractive index variations). In some embodiments, the spacing between the refractive index variations is less than or equal to 1 µm, less than or equal to 900 nm, less than or equal to 800 nm, less than or equal to 750 nm, less than or equal to 700 nm, less than or equal to 650 nm, less than or equal to 650 nm, less than or equal to 550 nm, less than or equal to 500 nm, less than or equal to 400 nm, less than or equal to 300 nm, less than or equal to 200 nm, or less than or equal to 100 nm. In some embodiments, the spacing between the refractive index variations is greater than or equal to 100 nm, greater than or equal to 200 nm, greater than or equal to 300 nm, greater than or equal to 400 nm, greater than or equal to 500 nm, greater than or equal to 550 nm, greater than or equal to 600 nm, greater than or equal to 650 nm, greater than or equal to 700 nm, greater than or equal to 750 nm, greater than or equal to 800 nm, or greater than or equal to 900 nm. Combinations of the foregoing ranges are also possible (e.g., less than or equal to 1 µm and greater than or equal to 100 nm). Other ranges are possible as this disclosure is not so limited.

In some embodiments, two or more sets of refractive index variations (e.g., nanoscale refractive index variations) may be present within the photonic material (e.g., within a photopolymer layer of the photonic material). For example, a photopolymer layer of the photonic material may comprise a first set of refractive index variations (e.g., within a first sublayer of the photopolymer layer) with a first characteristic dimension and a second set of refractive index variations (e.g., within a second sublayer of the photopolymer layer). In some embodiments, the photonic material comprises a plurality of refractive index variations. In some embodiments, the photonic material comprises 2 sets, 3 sets, 4 sets, 5 sets, 6 sets, 7 sets, 8 sets, 9 sets, or 10 sets of refractive index variations. In some embodiments, the photonic material comprises 20 sets, 50 sets, 100 sets, or 1000 sets of refractive index features, each of which may occupy a sublayer (e.g., a $20^{th}$ sublayer, a $50^{th}$ sublayer, a $100^{th}$ sublayer, a $1000^{th}$ sublayer) of the photopolymer layer.

As mentioned above, the photonic materials described herein may be deformed or otherwise mechanically strained. In some embodiments, the mechanical deformation is reversible. That is, in some embodiments, the photonic material may have a first configuration (e.g., an original configuration, an initial configuration), where it may reflect electromagnetic radiation (i.e., light) with a first wavelength. In some embodiments, the photonic material may be, subsequently, mechanically deformed to a second configuration, where it may reflect electromagnetic radiation with a second wavelength, different from the first wavelength. In some embodiments, the photonic material may be returned to the first configuration, for example, when the mechanical strain is removed from the photonic material, where it may reflect electromagnetic radiation with the first wavelength. Mechanical strain includes, but is not limited to, pulling, stretching, bending, folding, twisting, compressing, rolling, and/or pressing. In some embodiments the photonic material exhibits reversible color variation under the applied mechanical strain. Details regarding color variation are described in more detail below.

In some embodiments, the photonic material (e.g., a photo-responsive elastomer of the photopolymer layer) has a particular Young's elastic modulus. In some embodiments, the elastic modulus of the photonic material is less than or equal 100 MPa, less than or equal to 75 MPa, less than or equal to 50 MPa, less than or equal to 25 MPa, less than or equal to 10 MPa, less than or equal to 5 MPa, less than or equal to 1 MPa, less than or equal to 750 kPa, less than or equal to 500 kPa, less than or equal to 250 kPa, or less than or equal to 100 kPa. In some embodiment, the elastic modulus of the photonic material is greater than or equal to 100 kPa, greater than or equal to 250 kPa, greater than or equal to 500 kPa, greater than or equal to 750 kPa, greater than or equal to 1 MPa, greater than or equal to 5 MPa, greater than or equal to 10 MPa, greater than or equal to 25 MPa, greater than or equal to 50 MPa, greater than or equal to 75 MPa, or greater than or equal to 100 MPa. Combinations of the foregoing ranges are also possible (e.g., greater than or equal to 100 kPa and less than or equal to 100 MPa). Other ranges are possible.

As described above, in some embodiments, the photonic material may exhibit color variations when mechanically deformed. For example, in some embodiments, the photonic material may undergo a change in reflected color when the material is mechanically deformed. Without wishing to be bound by any particular theory, the photonic material may comprise refractive index variations of a particular arrangement, size, shape, and/or spacing such that incoming light is reflected with a particular color (i.e., with light of a particular wavelength), and upon deforming (e.g., stretching) the photonic material, the arrangement, size, shape and/or spacing of the refractive index variations may change such that the reflected light has a different color relative to the reflected light prior to deformation of the material. It is believed that deforming the photonic material may alter the spacing of the refractive index variations such that wavelength of reflected light is changed relative to a wavelength of reflected light in the undeformed photonic material with its original spacings of its refractive index variations.

In some embodiments, at least a portion of the photonic material may exhibit a first color. In some embodiments, at least a portion of the photonic material may be mechanically deformed and exhibit a second color. In some embodiments, the second color is different from the first color. In some embodiments, the photonic material may exhibit reversible color change such that the photonic material exhibits a first color when in the in a first configuration (e.g., a configuration in which the photonic material is not mechanically deformed), exhibits a second color when mechanically deformed to a second configuration different from the first configuration, and exhibits the first color when the mechanical deformation is removed.

Those of ordinary skill in the art would understand, based upon the teachings of this specification, that the reversible color change hall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. For example, in some embodiments, the reversible color change may not result in an exact return to the first color prior to deformation but should be interpreted as approximating the first color as defined mathematically, to an extent typically achievable and achieved for the recited fabrication technique as would be understood by those skilled in the art or as specifically described, Without wishing to be bound by theory, and solely for illustrative purposes, in an exemplary embodiment an applied deformation may at least partially irreversibly deform the photonic material such that, upon the release of the mechanical deformation, the photonic material does not return to it's original configuration but close to the first configuration. In some such embodiments, the color observed after removal of the mechanical deformation may approximate the first color, but not conform exactly to the same wavelength(s) observed prior to mechanical deformation.

In some embodiments, at least a portion of the photonic material may exhibit a first color. In some embodiments, at least a portion of the photonic material may be mechanically deformed and exhibit a second color. In some embodiments, the second color is different from the first color. In some embodiments, the photonic material may exhibit a color change such that the photonic material exhibits a first color when in the in a first configuration (e.g., a configuration in which the photonic material is not mechanically deformed), exhibits a second color when mechanically deformed to a second configuration different from the first configuration, and exhibits a third color when the mechanical deformation is removed, the third color being different than the first color and the second color.

However, it should also be understood that, in some embodiments, the photonic material may exhibit irreversible color change when mechanically formed. That is, in some embodiments, the photonic material (or at least a portion of the photonic material) may be mechanically deformed from a first configuration to a second configuration and exhibit a first color (or first wavelength) while in the first configuration and exhibit a second color (or second wavelength), different from the first color when in the second configuration. In some embodiments, when the material is returned to the first configuration, the material still exhibits the second color, even though the material is in the first configuration.

In some embodiments, different portions of the photonic material may exhibit a first color in a first portion of the photonic material and may exhibit a second color in a second portion of the photonic material. In some embodiments, the second color is different than the first color. In some embodiments, when the photonic material is mechanically deformed, the photonic material may exhibit a third color in the first portion of the photonic material and may exhibit a fourth color in the second portion, wherein the third color is different from the first color and/or the fourth color is different from second color. In some such embodiments, the color change may be reversible, such that upon removing the mechanical deformation (or otherwise returning the photonic material to its first or original configuration), the photonic material exhibits the first color at the first portion of the photonic material and exhibits the second color at the at the second portion of the photonic material.

In some embodiments, the photonic material may include a first portion that exhibits color change (e.g., reversible color change) upon mechanical deformation, while a second portion, different than the first portion, does not exhibit color change upon mechanical deformation. That is, in some embodiments, the photonic material may have a portion that exhibits color change when the material is stretched or otherwise mechanically deformed, while also having a portion that does not exhibit color change when the material is stretched or otherwise mechanically deformed.

In some embodiments, an image may be formed on or within the photonic material (e.g., on or within a photopolymer layer of the photonic material). In some such embodiments, the image is a color image and comprises a plurality of colors. In some embodiments, each position within the image (e.g., a pixel within the image) may each independently exhibit a first color, a first color of a first pixel being the same or different from a first color of a second pixel (or third pixel, or fourth pixel, etc.). In some embodiments, the photonic material may be mechanically deformed such that at least a portion of each position within the image each independently exhibits a second color different than first color. In some such embodiments, each position within the image may independently exhibit the first color when the mechanical deformation is removed, and the photonic material is returned to the state it was in prior to application of the mechanical deformation. In some embodiments, at least a portion of the pixels return to the first color after removal of the mechanical deformation (e.g., the photonic material returns to the first configuration). In some embodiments, substantially all of the pixels return to the first color after removal of the mechanical deformation (e.g., the photonic material returns to the first configuration). In some embodiments, at least a portion of the pixels maintain the second color after removal of the mechanical deformation (e.g., the photonic material returns to the first configuration). In some embodiments, a first plurality of pixels change color upon application of a mechanical deformation and a second plurality of pixels do not substantially change color upon application of the mechanical deformation.

In an illustrative embodiment, the photonic material may show a first image having a plurality of colors (e.g., each color represented by a pixel in the image) and, upon mechanical deformation of the photonic material, the photonic material shows a second image having a different plurality of colors than the first image.

In some embodiments, as described above, the photonic material is deformable. In some embodiments, the photonic material exhibits reversible color variation under applied mechanical strain. In some embodiments, the photonic material is capable of generating a color pattern or image. In some embodiments, the photonic material exhibits specular reflectance and/or diffuse reflectance. For embodiments in which the photonic material provides diffuse reflectance, these photonic materials may advantageously be perceived in a wider range of viewing angles and may also ensure a reduced dependency on illumination conditions by removing the image of the illuminating scene from the reflection and thereby providing more uniform color.

It should be understood that while various embodiments are described as undergoing color change or a color variation, any light (e.g., electromagnetic radiation) may undergo a change or variation (e.g., in wavelength) upon reflecting from the photonic materials described herein, and the embodiments are not limited to only color. As understood by those skilled in the art, color generally includes light within the visible light spectrum (e.g., approximately 380 nm to 700 nm), but the present disclosure is not limited to light only within this range, as any suitable wavelength of electromagnetic radiation may be capable of experiencing a change in wavelength upon interacting with the disclosed photonic materials in a deformed state relative to an undeformed state. For example, in some embodiments, the photonic material may reflect visible light (i.e., color) when in a first configuration (e.g., when the photonic material is in an undeformed state) and may reflect infrared light (i.e., non-visible light) upon deformation of the photonic material Similarly, in some embodiments, the photonic material may reflect ultraviolet (i.e., non-visible light) when in a first configuration and may reflect blue light (i.e., visible light) upon deformation of the photonic material.

In some embodiments, the photonic material may reflect a portion of incident light, while also transmitting a portion of incident light. In some embodiments, at least 5%, at least 10%, at least 15%, at least 20%, at least 30%, at least 40%, or at least 50% of incident light is transmitted by the photonic material. In some embodiments, no greater than 50%, no greater than 40%, no greater than 30%, no greater than 20%, no greater than 10%, or no greater than 5% of incident light is transmitted by the photonic material. Combinations of the foregoing ranges are also possible (e.g., at least 5% and no greater than 20% of incident light is transmitted). Other ranges are possible. In some embodiments, the amount of reflect and/or transmitted light is defined or determined by the period of the refractive index variations (i.e., the refractive index variations may determine the wavelength or range of wavelengths reflected).

In some embodiments, the color observed for the photonic material is related to the amount of reflected light relative to the amount of transmitted light. For example, if the photonic material reflects red light, then it may transmit green and/or blue light and hence may appear teal. As another example, the photonic material may be deformed and the reflected light transitions from red to green to blue as the material is mechanically deformed and may then transmit light that transitions from teal to purple to yellow as the material is mechanically deformed. Of course, other color changes are possible, and those skilled in the art in view of the present disclosure will be capable of adjusting the relative amounts of transmitted and reflected light.

The observed color variations may be measured using a setup that comprises a tensile tester for measuring mechanical deformation, a spectrometer for measuring the wavelength of reflective light, and a microscope for visually observing the color variations of an image of the photonic material. Such a setup may allow the spectral reflectance of the photonic material to be measured as a function of applied strained. In some embodiments, the reflectance spectrum obtained may be mapped to a point in a color space (e.g., CIE 1931 color space) so that the observed color (or light) may be translated into color seen by an observer.

In some embodiments, the observed change in color is reversible. For example, upon release of the mechanical deformation or applied stress, the color of the article may revert to the pre-deformed color. In some embodiments, the color may change from one or more colors in the visible light spectrum in a first configuration to one or more colors in the visible light spectrum in second configuration (e.g., from red to orange, from red to yellow, from red to green, from red to blue, from red to violet, from orange to red, from orange to yellow, from orange to green, from orange to blue, from orange to violet, from yellow to red, from yellow to orange, from yellow to green, from yellow to blue, from yellow to violet, from green to red, from green to orange, from green to yellow, from green to blue, from green to violet, from blue to red, from blue to orange, from blue to yellow, from blue to green, from blue to violet, from violet to red, from violet to orange, from violet to yellow, from violet to green, from violet to blue). Those of ordinary skill in the art would understand, based upon the teachings of this specification, that the first color and/or second color need not necessarily be in the visible light spectrum and may include ultraviolet, infrared, etc.

In some embodiments, the photonic material (e.g., a photopolymer layer of the photonic material) exhibits a change in observed color and/or wavelength by a certain amount when in a first configuration (e.g., an unstretched configuration) relative to a second configuration (e.g., a stretched configuration) upon application of a mechanical stress. For example, in some embodiments, the observed wavelength changes by greater than or equal to 0.5 nm, greater than or equal to 1 nm, greater than or equal to 5 nm, greater than or equal to 10 nm, greater than or equal to 20 nm, greater than or equal to 25 nm, greater than or equal to 50 nm, greater than or equal to 75 nm, greater than or equal to 100 nm, greater than or equal to 200 nm, greater than or equal to 300 nm, greater than or equal to 400 nm, or greater than or equal to 500 nm. In some embodiments, the observed wavelength changes by less than or equal to 500 nm, less than or equal to 400 nm, less than or equal to 300 nm, less than or equal to 200 nm, less than or equal to 100 nm, less than or equal to 75 nm, less than or equal to 50 nm, less than or equal to 25 nm, less than or equal to 20 nm, less than or equal to 10 nm, less than or equal to 5 nm, less than or equal to 1 nm, or less than or equal to 0.5 nm. Combinations of the above-referenced ranges are also possible (e.g., greater than or equal to 0.5 nm and less than or equal to 500 nm). Other ranges are possible. In some embodiments, the photonic material exhibits an increase in wavelength when in a first configuration relative to a second configuration (e.g., from 400 nm to 500 nm). In some embodiments, the photonic material exhibits a decrease in wavelength when in a first configuration relative to a second configuration (e.g., from 500 nm to 400 nm).

The color observed from the photonic material may include any type of electromagnetic radiation (i.e., electromagnetic radiation of any wavelength). Such electromagnetic radiation observed may include, but is not limited to, ultraviolet radiation (e.g., having a wavelength in a range from 10 nm to 380 nm), visible light (e.g., having a wavelength in a range from 380 nm to 740 nm), near-infrared radiation (e.g., having a wavelength in a range from 700 nm to 800 nm), and infrared radiation (e.g., having a wavelength in a range from 740 nm to 3 μm).

For example, the wavelength(s) of light observed from the photonic material may comprise any suitable wavelength of electromagnetic radiation. In some embodiments, the light is monochromatic light of a single wavelength. In some embodiments, the light is polychromatic comprising two or more light waves of a different wavelengths. In some embodiments, the light observed from the photonic material comprises wavelengths greater than or equal to 250 nm, greater than or equal to 275 nm, greater than or equal to 300 nm, greater than or equal to 325 nm, greater than or equal to 350 nm, greater than or equal to 375 nm, greater than or equal to 400 nm, greater than or equal to 425 nm, greater than or equal to 450 nm, greater than or equal to 475 nm, greater than or equal to 500 nm, greater than or equal to 525 nm, greater than or equal to 550 nm, greater than or equal to 575 nm, greater than or equal to 600 nm, greater than or equal to 625 nm, greater than or equal to 650 nm, greater than or equal to 675 nm, greater than or equal to 700 nm, greater than or equal to 725 nm, greater than or equal to 750 nm, greater than or equal to 775 nm, or greater than or equal 800 nm. In some embodiments, the light observed from the photonic material comprises wavelengths less than or equal to 800 nm, less than or equal to 775 nm, less than or equal to 750 nm, less than or equal to 725 nm, less than or equal to 700 nm, less than or equal to 675 nm, less than or equal to 650 nm, less than or equal to 625 nm, less than or equal to 600 nm, less than or equal to 575 nm, less than or equal to 550 nm, less than or equal to 525 nm, less than or equal to 500 nm, less than or equal to 475 nm, less than or equal to 450 nm, less than or equal to 425 nm, less than or equal to 400 nm, less than or equal 375 nm, less than or equal to 350 nm, less than or equal to 325 nm, less than or equal to 300 nm, less than or equal to 275 nm, or less than or equal to 250 nm. Combinations of the foregoing ranges are also possible (e.g., greater than or equal to 250 nm and less than or equal to 800 nm). Other ranges are possible. In some embodiments, the light observed from the photonic material comprises two or more ranges selected from the above-referenced ranges of electromagnetic radiation.

In some embodiments, the light observed from the photonic material comprises broadband radiation. In certain instances, the light observed from the photonic material comprises a wavelength range spanning at least 350 nm, at least 360 nm, at least 370 nm, at least 380 nm, at least 390 nm, at least 400 nm, at least 500 nm, at least 1 μm, at least 2 μm, or at least 3 μm. In certain instances, the source of electromagnetic radiation is configured to emit electromagnetic radiation in a wavelength range spanning 350 nm to 400 nm, 350 nm to 500 nm, 350 nm to 1 μm, 350 nm to 2 μm, 350 nm to 3 μm, 400 nm to 500 nm, 400 nm to 1 μm, 400 nm to 2 μm, 400 nm to 3 μm, 500 nm to 1 μm, 500 nm to 2 μm, 500 nm to 3 μm, 1 μm to 2 μm, or 1 μm to 3 μm.

In some embodiments, the light observed from the photonic material comprises a wavelength range spanning at least 350 nm, at least 360 nm, at least 370 nm, at least 380 nm, at least 390 nm, at least 400 nm, at least 500 nm, at least 600 nm, at least 700 nm, or at least 800 nm. In certain instances, the light observed from the photonic material comprises a wavelength range of greater than or equal to 350 nm, greater than or equal to 400 nm, greater than or equal to 450 nm, greater than or equal to 500 nm, greater than or equal to 550 nm, greater than or equal to 600 nm, greater than or equal to 650 nm, greater than or equal to 700 nm, or greater than or equal to 750 nm and less than or equal to 800 nm, less than or equal to 750 nm, less than or equal to 700 nm, less than or equal to 650 nm, less than or equal to 600 nm, less than or equal to 550 nm, less than or equal to 500 nm, less than or equal to 450 nm, or less than or equal to 400 nm. Combinations of the above referenced ranges are also possible (e.g., greater than or equal to 350 nm and less than or equal to 800 nm). Other ranges are also possible.

In some embodiments, the light observed from the photonic material comprises relatively narrow ranges of wavelengths. In some embodiments, the light observed from the photonic material comprises a discrete wavelength range spanning 350 nm or less, 300 nm or less, 200 nm or less, 100 nm or less, 90 nm or less, 80 nm or less, 70 nm or less, 60 nm or less, 50 nm or less, 40 nm or less, 30 nm or less, 20 nm or less, or 10 nm or less. In some embodiments, the light observed from the photonic material comprises a discrete wavelength range spanning 10 nm to 20 nm, 10 nm to 40 nm, 10 nm to 50 nm, 10 nm to 60 nm, 10 nm to 80 nm, 10 nm to 100 nm, 10 nm to 200 nm, 10 nm to 300 nm, 10 nm to 350 nm, 20 nm to 40 nm, 20 nm to 50 nm, 20 nm to 60 nm, 20 nm to 80 nm, 20 nm to 100 nm, 20 nm to 200 nm, 20 nm to 300 nm, 20 nm to 350 nm, 40 nm to 60 nm, 40 nm to 80 nm, 40 nm to 100 nm, 40 nm to 200 nm, 40 nm to 300 nm, 40 nm to 350 nm, 50 nm to 100 nm, 50 nm to 200 nm, 50 nm to 300 nm, 50 nm to 350 nm, 100 nm to 200 nm, 100 nm to 300 nm, or 100 nm to 350 nm.

In some embodiments, the light observed from the photonic material comprises a discrete wavelength range spanning 500 nm or less, 400 nm or less, 350 nm or less, 300 nm or less, 200 nm or less, 100 nm or less, 90 nm or less, 80 nm or less, 70 nm or less, 60 nm or less, 50 nm or less, 40 nm or less, 30 nm or less, 20 nm or less, or 200 nm or less. In some embodiments, the light observed from the photonic material comprises a discrete wavelength range spanning 200 nm to 20 nm, 200 nm to 40 nm, 200 nm to 50 nm, 200 nm to 60 nm, 200 nm to 80 nm, 200 nm to 100 nm, 200 nm to 200 nm, 200 nm to 300 nm, 200 nm to 350 nm, 20 nm to 40 nm, 20 nm to 50 nm, 20 nm to 60 nm, 20 nm to 80 nm, 20 nm to 100 nm, 20 nm to 200 nm, 20 nm to 300 nm, 20 nm to 350 nm, 40 nm to 60 nm, 40 nm to 80 nm, 40 nm to 100 nm, 40 nm to 200 nm, 40 nm to 300 nm, 40 nm to 350 nm, 50 nm to 100 nm, 50 nm to 200 nm, 50 nm to 300 nm, 50 nm to 350 nm, 100 nm to 200 nm, 100 nm to 300 nm, or 100 nm to 500 nm.

In some embodiments, the light observed from the photonic material comprises wavelengths of violet light (e.g., light having a peak wavelength in a range of 400 nm to 450 nm), blue light (e.g., light having a peak wavelength in a range from 450 nm to 490 nm), cyan light (e.g., light having a peak wavelength in a range from 490 nm to 520 nm), green light (e.g., light having a peak wavelength in a range from 520 nm to 560 nm), yellow light (e.g., light having a peak wavelength in a range from 560 nm to 590 nm), orange light (e.g., light having a peak wavelength in a range from 590 nm to 635 nm), red light (e.g., light having a peak wavelength in a range from 635 nm to 700 nm), or combinations thereof. In some embodiments, the light observed from the photonic material comprises wavelengths in a plurality of relatively narrow ranges of wavelengths. In certain instances, the source of electromagnetic radiation is configured to emit electromagnetic radiation in at least 2 discrete ranges, at least 3 discrete ranges, at least 4 discrete ranges, or at least 5 discrete ranges.

In some embodiments, the light observed from the photonic material comprises wavelengths having at least a first portion of the electromagnetic radiation spectrum and a second portion of the electromagnetic radiation spectrum, each selected from the one or more above-referenced ranges.

In some embodiments, the light observed from the photonic material is different at various locations across a surface of the photonic material. For example, in some embodiments, a first portion of the surface of the photonic material is observed to have a first wavelength(s) of electromagnetic radiation and a second portion of the surface of the photonic material is observed to have a second wavelength(s) of electromagnetic radiation, different than the first wavelength(s) of electromagnetic radiation, for a given configuration of the photonic material. As mentioned above, the photonic materials described herein may include a photopolymer layer. In some embodiments, the photopolymer layer may comprise a photopolymeric material. Any suitable photopolymeric material may be used. The photopolymeric material may include a photoiniator, a monomer, and/or oligomer, and the photoiniator may tune polymerization of the monomers and/or the oligomers of the photopolymeric material upon exposure to photons (i.e., light). Non-limiting examples of photopolymeric materials include epoxides, urethanes, ethers (e.g., polyethers), or esters (e.g., polyesters), methacrylic acid, hydroxyethyl acrylate, hydroxyethyl methacrylate, hydroxypropyl methacrylate, isodecyl acrylate, polyacrylamides, N-vinyl pyrrolidone, trimethylolpropane triacrylate (TMPTA), ethoxylated TMPTA, trimethylolpropane trimethacrylate, hexanediol diacrylatebenzophenone, xanthones, and quinones. In some embodiments, the photopolymeric material comprises an elastomer. In some embodiments, the photopolymer layer comprises a photo-responsive elastomer. In some embodiments, the photopolymeric material comprises a holographic recording material. In some embodiments, the photopolymer layer comprises two or more sublayers, and each layer may contain a distinct photopolymeric material. By way of example, a photopolymer layer may comprise three sublayers, where a first sublayer may react to red light, a second sublayer that may react with blue light, a third sublayer that may react with green light. In some embodiments, the photopolymer comprises a holographic material, such as material comprising a silver halide emulsion. In some embodiments, the photopolymer layer comprises a polycarbonate polymeric material, such as Bayfol® HX films. Other materials are possible.

In some embodiments, the photopolymer layer (e.g., a photo-responsive elastomer of the photopolymer layer) has a particular Young's elastic modulus. In some embodiments, the elastic modulus of the photopolymer layer is less than or equal 100 MPa, less than or equal to 75 MPa, less than or equal to 50 MPa, less than or equal to 25 MPa, less than or equal to 10 MPa, less than or equal to 5 MPa, less than or equal to 1 MPa, less than or equal to 750 kPa, less than or equal to 500 kPa, less than or equal to 250 kPa, less than or equal to 100 kPa, less than or equal to 50 kPa, less than or equal to 25 kPa, or less than or equal to 10 kPa. In some embodiment, the elastic modulus of the photopolymer layer is greater than or equal to 10 kPa, greater than or equal to 25 kPa, greater than or equal to 50 kPa, greater than or equal to 100 kPa, greater than or equal to 250 kPa, greater than or equal to 500 kPa, greater than or equal to 750 kPa, greater than or equal to 1 MPa, greater than or equal to 5 MPa, greater than or equal to 10 MPa, greater than or equal to 25 MPa, greater than or equal to 50 MPa, greater than or equal to 75 MPa, or greater than or equal to 100 MPa. Combinations of the foregoing ranges are also possible (e.g., greater than or equal to 100 kPa and less than or equal to 100 MPa). Other ranges are possible.

In some embodiments, the photopolymer layer comprises refractive index variations, for example, nanoscale refractive index variations. Details regarding the refractive index variations are described in more detail elsewhere herein. In some embodiments, the photopolymer layer comprises a photo-responsive elastomer optically patterned with nanoscale refractive index variations.

The photopolymer layer may have any suitable thickness. In some embodiments, a thickness of the photopolymer layer is less than or equal to 1 mm, less than or equal to 900 μm, less than or equal to 800 μm, less than or equal to 700 μm, less than or equal to 600 μm, less than or equal to 500 μm, less than or equal to 400 μm, less than or equal to 300 μm, less than or equal to 200 μm, less than or equal to 100 μm, less than or equal to 75 μm, less than or equal to 50 μm, less than or equal to 25 μm, or less than or equal to 10 μm. In some embodiments, the thickness of the photopolymer layer is greater than or equal to 10 μm, greater than or equal to 25 μm, greater than or equal to 50 μm, greater than or equal to 100 μm, greater than or equal to 200 μm, greater than or equal to 300 μm, greater than or equal to 400 μm, greater than or equal to 500 μm, greater than or equal to 600 μm, greater than or equal to 700 μm, greater than or equal to 800 μm, greater than or equal to 900 μm, or greater than or equal to 1 mm Combinations of the above-referenced ranges are also possible (e.g., greater than or equal to 100 μm and less than or equal to 1 mm) Other ranges are possible.

As described in more detail elsewhere herein, the photopolymer layer may be adjacent to one or more other layers. For example, in some embodiments, the photonic material further comprises a reflection layer adjacent to the photopolymer layer. In some embodiments, a backing layer is adjacent to the photopolymer layer. In some embodiments, the photopolymer may be bonded or adhered to another layer, such as a backing layer or a layer associated with a wearable devices or article. In some embodiments, a plasma treatment (e.g., oxygen plasma) may facilitate adhesion of the photopolymer layer to another layer.

In some embodiments, the photopolymer may have a particular RMS surface roughness. In some embodiments, the RMS surface roughness of the photopolymer layer is less than or equal to 10 nanometers, less than or equal to 9 nanometers, less than or equal to 8 nanometers, less than or equal to 7 nanometers, less than or equal to 6 nanometers, less than or equal to 5 nanometers, less than or equal to 4 nanometers, less than or equal to 3 nanometers, less than or equal to 2 nanometers, or less than or equal to 1 nanometer. In some embodiments, the RMS surface roughness of the photopolymer layer is greater than or equal to 1 nanometer, greater than or equal to 2 nanometers, greater than or equal to 3 nanometers, greater than or equal to 4 nanometers, greater than or equal to 5 nanometers, greater than or equal to 6 nanometers, greater than or equal to 7 nanometers, greater than or equal to 8 nanometers, greater than or equal to 9 nanometers, or greater than or equal to 10 nanometers. Combinations of the above referenced ranges are also possible (e.g., greater than or equal to 1 nanometer and less than or equal to 10 nanometers). Other ranges are possible.

In some embodiments, a particular amount of incident light is reflected by the photopolymer layer (e.g., after an image has been formed in the photopolymer layer). In some embodiments, at least 50%, at least 60%, at least 70%, at least 80%, at least 85%, at least 90%, or at least 95% of the incident light is reflected by the photopolymer layer. In some embodiments, less no greater than 95%, no greater than 90%, no greater than 85%, no greater than 80%, or no greater than 70% of the incident light is reflected by the photopolymer layer. Combinations of the foregoing range are also possible (at least 50% and no greater than 95%). Other ranges are possible. In some embodiments, the reflected light is of a particular wavelength or has a maximum at a particular wavelength.

As mentioned above, in some embodiments, the photopolymer layer may be positioned adjacent to a reflection layer. In some embodiments, the reflection layer may be relatively smooth and may facilitate specular reflections. However, in other embodiments, the reflection layer may be textured or have relatively rough surface and may facilitate diffuse reflections.

The reflection layer may be of any suitable material that may reflect incident light to the photopolymer layer. In some embodiments, the reflection layer comprises a mirror (e.g., a smooth mirror). In some embodiments, the reflection layer comprises a textured reflector, such as textured metal (e.g., brushed aluminum and/or stainless steel).

In some embodiments, the reflection layer may be relatively smooth and comprise a low RMS surface roughness. In some embodiments, the RMS surface roughness of the reflection layer is less than or equal to 10 nanometers, less than or equal to 9 nanometers, less than or equal to 8 nanometers, less than or equal to 7 nanometers, less than or equal to 6 nanometers, less than or equal to 5 nanometers, less than or equal to 4 nanometers, less than or equal to 3 nanometers, less than or equal to 2 nanometers, or less than or equal to 1 nanometer. In some embodiments, the RMS surface roughness of the reflection layer is greater than or equal to 1 nanometer, greater than or equal to 2 nanometers, greater than or equal to 3 nanometers, greater than or equal to 4 nanometers, greater than or equal to 5 nanometers, greater than or equal to 6 nanometers, greater than or equal to 7 nanometers, greater than or equal to 8 nanometers, greater than or equal to 9 nanometers, or greater than or equal to 10 nanometers. Combinations of the above-referenced ranges are also possible (e.g., greater than or equal to 1 nanometer and less than or equal to 10 nanometers). Other ranges are possible. It should also be understood that while reflectors may be relatively smooth, in other embodiments, the reflector may have a relatively rough surface, as this disclosure is not so limited.

In some embodiments, the reflection layer has a roughness such that periodic variations in the associated photopolymer are greater than or equal to 100 nm, greater than or equal to 250 nm, greater than or equal to 500 nm, greater than or equal to 750 nm, or greater than or equal to 1000 nm. In some embodiments, the reflection layer has a roughness such that periodic variations in the associated photopolymer are less than or equal to 1000 nm, less than or equal to 750 nm, less than or equal to 500 nm, less than or equal to 250 nm, or less than or equal to 100 nm. Combinations of the above-referenced ranges are also possible (e.g., greater than or equal to 100 nm and less than or equal to 1000 nm). Other ranges are possible.

In some embodiments, a particular amount of incident light is reflected by the reflection layer. In some embodiments, at least 50%, at least 60%, at least 70%, at least 80%, at least 85%, at least 90%, or at least 95% of the incident light is reflected by the reflection layer. In some embodiments, less no greater than 95%, no greater than 90%, no greater than 85%, no greater than 80%, or no greater than 70% of the incident light is reflected by the reflection layer. Combinations of the foregoing range are also possible (at least 50% and no greater than 95%). Other ranges are possible. In some embodiments, the reflected light is of a particular wavelength or has a maximum at a particular wavelength.

The reflection layer may have any suitable thickness. In some embodiments, a thickness of the reflection layer is less than or equal to 1 mm, less than or equal to 900 µm, less than or equal to 800 µm, less than or equal to 700 µm, less than or equal to 600 µm, less than or equal to 500 µm, less than or equal to 400 µm, less than or equal to 300 µm, less than or equal to 200 µm, or less than or equal to 100 µm. In some embodiments, the thickness of the reflection layer is greater than or equal to 100 µm, greater than or equal to 200 µm, greater than or equal to 300 µm, greater than or equal to 400 µm, greater than or equal to 500 µm, greater than or equal to 600 µm, greater than or equal to 700 µm, greater than or equal to 800 µm, greater than or equal to 900 µm, or greater than or equal to 1 mm Combinations of the above-referenced ranges are also possible (e.g., greater than or equal to 100 µm and less than or equal to 1 mm) Other ranges are possible.

In some embodiments, a backing layer is present adjacent to the photopolymer layer. The backing layer may further tune the physical and/or optical properties of the photonic material, such as light filtering, enhancing saturation of the reflected colors, and supporting the stretchability of the photopolymer layer. Advantageously, the backing layer may also tune or enhance the color-changing properties of the photopolymer layer, for example, by modifying properties of electromagnetic radiation transmitting and/or reflecting from the photopolymer layer. In some embodiments, the backing layer is deformable (e.g., reversibly deformable) and/or is configured to mechanically deform in tandem with the photopolymer layer. For some embodiments, the photopolymer layer may have an image on a surface of the layer (e.g., a front surface of the photopolymer), in which case the backing surface may be positioned on a side opposite the image (i.e., on a back surface of the photopolymer layer).

In some embodiments, the backing layer may reflect or is configured to reflect at least a portion of incident light (e.g., light transmitted through the photopolymer layer). In some embodiments, at least 50%, at least 60%, at least 70%, at least 80%, at least 90%, at least 99%, or at least 99.99% of incident light is reflected by the backing layer. In some embodiments, no greater than 99.9%, no greater than 99%, no greater than 90%, no greater than 80%, no greater than 70%, no greater than 60%, no or greater than 50% of incident light is reflected by the backing layer. Combinations of the foregoing ranges are also possible (e.g., greater than or equal to 50% and less than or equal to 95% of light is reflected by the backing layer). Other ranges are possible. In some embodiments, the backing layer may reflect light while in a mechanically undeformed configuration and/or in a deformed configuration.

In some embodiments, the backing layer may transmit incident light (e.g., light passing through from the photopolymer to the backing layer). In some embodiments, the backing layer may reflect at least some incident light and transmit at least some incident light. In some embodiments, at least 1%, at least 5%, at least 10%, at least 25%, at least 50%, at least 75%, at least 95%, at least 99%, or at least 99.99% of incident light is transmitted through the backing layer. In some embodiments, the backing layer is transparent, such that all incident light is transmitted through the backing layer (i.e., 100% of incident light is transmitted through the backing layer). In some embodiments, no greater than 99.99%, no greater than 99%, no greater than 95%, no greater than 75%, no greater than 50%, no greater than 25%, or no greater than 10%, no greater than 5%, or no greater than 1% of incident light is transmitted through backing layer. Combinations of the above-referenced ranges are also possible (e.g., at least 1% of incident light and no greater than 95% of incident light is transmitted through the backing layer). Other ranges are possible. In some embodiments, the backing layer is opaque, such that no incident light is transmitted through the backing layer (i.e., 0% of incident light is transmitted through the backing layer). In some embodiments, the backing layer may transmit and/or reflect light in a mechanically undeformed configuration and/or a mechanically deformed configuration.

In some embodiments, the backing layer may absorb at least a portion of incident light. In some embodiments, at least 5%, at least 10%, at least 15%, at least 20%, at least 25%, or at least 50% of incident light is absorbed by the backing layer. In some embodiments, no greater than 50%, no greater than 25%, no greater than 20%, no greater than 15%, no greater than 10%, or no greater than 5% of incident light is absorbed by the backing layer. Combinations of the foregoing ranges are also possible (e.g., at least 5% and no greater than 50% of incident light is absorbed by the backing layer). Other ranges are possible.

The backing layer may be of any suitable material. In some embodiments, the backing layer comprises a polymeric material such as silicones, polyurethanes, isoprene and isoprene-derivatives, thermoplastics, and thermoplastic elastomers, as non-limiting examples. In some embodiments, the backing layer comprises silicone (e.g., black silicone). In some embodiments, the backing layer comprises an elastomer. In some embodiments, the backing layer comprises silicone, polyurethane, natural polyisoprene, and/or synthetic polyisoprene. In some embodiments, the mechanical properties of the article are generally related to the mechanical properties of the backing layer. For example, the overall elasticity of the photonic material may be related to the elasticity of the backing layer. However, in other embodiments, the mechanical properties of the article are not related to the mechanical properties of the backing layer.

In some embodiments, the backing layer has a particular Young's elastic modulus. In some embodiments, the elastic modulus of the backing layer is less than or equal to 5 GPa, less than or equal to 3 GPa, less than or equal to 1 GPa, less than or equal to 750 MPa, less than or equal to 500 MPa, less than or equal to 250 MPa, less than or equal 100 MPa, less than or equal to 75 MPa, less than or equal to 50 MPa, less than or equal to 25 MPa, less than or equal to 10 MPa, less than or equal to 5 MPa, less than or equal to 1 MPa, less than or equal to 750 kPa, less than or equal to 500 kPa, less than or equal to 250 kPa, less than or equal to 100 kPa, less than or equal to 75 kPa, less than or equal to 50 kPa, less than or equal to 25 kPa, or less than or equal to 10 kPa. In some embodiment, the elastic modulus of the backing layer is greater than or equal to 10 kPa, greater than or equal to 25 kPa, greater than or equal to 50 kPa, greater than or equal to 75 kPa, greater than or equal to 100 kPa, greater than or equal to 250 kPa, greater than or equal to 500 kPa, greater than or equal to 750 kPa, greater than or equal to 1 MPa, greater than or equal to 5 MPa, greater than or equal to 10 MPa, greater than or equal to 25 MPa, greater than or equal to 50 MPa, greater than or equal to 75 MPa, greater than or equal to 100 MPa, greater than or equal to 250 MPa, greater than or equal to 500 MPa, greater than or equal to 750 MPa, greater than or equal to 1 GPa, greater than or equal to 3 GPa, or greater than or equal to 1 GPa. Combinations of the foregoing ranges are also possible (e.g., greater than or equal to 10 kPa and less than or equal to 5 GPa). Other ranges are possible.

In some embodiments, the backing layer may have a different elasticity relative to the photopolymer layer. In some embodiments, the Young's modulus of the backing layer is at least 1 times greater, 1.1 times greater, 1.2 times greater, 1.5 times greater, 2 times greater, 3 times greater 4 times greater, 5 times greater, 10 times greater, 20 times greater 50 times greater, 75 times greater 100 times greater, 500 times greater, 1000 times greater, or more than the Young's modulus of the photopolymer layer. In some embodiments, the Young's modulus of the photopolymer layer is at least 1 times greater, 1.1 times greater, 1.2 times greater, 1.5 times greater, 2 times greater, 3 times greater 4 times greater, 5 times greater, 10 times greater, 20 times greater, 50 times greater, 75 times greater, 100 times greater, 500 times greater, 1000 times greater or more than the Young's modulus of the backing layer.

The backing layer may have any suitable thickness. In some embodiments, a thickness of the backing layer is less than or equal to 1 mm, less than or equal to 900 μm, less than or equal to 800 μm, less than or equal to 700 μm, less than or equal to 600 μm, less than or equal to 500 μm, less than or equal to 400 μm, less than or equal to 300 μm, less than or equal to 200 μm, or less than or equal to 100 μm. In some embodiments, the thickness of the backing layer is greater than or equal to 100 μm, greater than or equal to 200 μm, greater than or equal to 300 μm, greater than or equal to 400 μm, greater than or equal to 500 μm, greater than or equal to 600 μm, greater than or equal to 700 μm, greater than or equal to 800 μm, greater than or equal to 900 μm, or greater than or equal to 1 mm. Combinations of the above-referenced ranges are also possible (e.g., greater than or equal to 100 µm and less than or equal to 1 mm) Other ranges are possible.

In some embodiments, a source of electromagnetic radiation may be used, for example, to provide an image on a surface (e.g., a front surface) of the photopolymer layer, to photopolymerize a photopolymeric material within the photopolymer, and/or to optically pattern a photo-responsive elastomer with refractive index variations (e.g., nanoscale refractive index variations). Without wishing to be bound by any particular theory, the source of electromagnetic radiation may provide light to the photopolymer layer and/or the reflection layer, creating a standing wave of electromagnetic radiation (e.g., after reflecting from the reflection layer). The standing wave may photopolymerize a polymer (e.g., a photo-responsive elastomer) within the photopolymer layer such that it creates periodic refractive index variations within the photopolymer layer. As described elsewhere herein, the optically patterned refractive index variations within the photopolymer may be mechanically deformed by an applied stress (e.g., pulling, stretching, bending) such that the spacing between the features is changed and hence the color reflected by the photopolymer layer is also changed.

Any suitable source of electromagnetic radiation may be used. In some embodiments, the source of electromagnetic radiation is a light source. In some embodiments, the source of electromagnetic radiation is standard projector. In some such embodiments, the desired image may be selected (e.g., with a computer or other electronic device) and a projector may be used to project the image onto the photopolymer layer. However other sources of electromagnetic radiation are possible. In some embodiments, the source of electromagnetic radiation comprises a light-emitting diode (LED), a laser, and/or, an incandescent bulb, as non-limiting examples. In some embodiments, the source of electromagnetic radiation provides spatially incoherent light. In some embodiments, spatially incoherent light is used to generate a standing wave pattern in the photopolymer layer. In some embodiments, the source of electromagnetic radiation provides a source of coherent light.

The source of electromagnetic radiation may provide any type of electromagnetic radiation (i.e., electromagnetic radiation of any wavelength). Suitable types of electromagnetic radiation that may be emitted include, but are not limited to, ultraviolet radiation (e.g., having a wavelength in a range from 10 nm to 380 nm), visible light (e.g., having a wavelength in a range from 380 nm to 740 nm), near-infrared radiation (e.g., having a wavelength in a range from 700 nm to 800 nm), and infrared radiation (e.g., having a wavelength in a range from 740 nm to 3 µm).

For example, the wavelength(s) of light emitted from the source of electromagnetic radiation may be of any suitable wavelength. In some embodiments, the light is monochromatic light of a single wavelength. In some embodiments, the light is polychromatic comprising two or more light waves of a different wavelengths. In some embodiments, the wavelength of light emitted from the source of electromagnetic radiation is greater than or equal to 250 nm, greater than or equal to 275 nm, greater than or equal to 300 nm, greater than or equal to 325 nm, greater than or equal to 350 nm, greater than or equal to 375 nm, greater than or equal to 400 nm, greater than or equal to 425 nm, greater than or equal to 450 nm, greater than or equal to 475 nm, greater than or equal to 500 nm, greater than or equal to 525 nm, greater than or equal to 550 nm, greater than or equal to 575 nm, greater than or equal to 600 nm, greater than or equal to 625 nm, greater than or equal to 650 nm, greater than or equal to 675 nm, greater than or equal to 700 nm, greater than or equal to 725 nm, greater than or equal to 750 nm, greater than or equal to 775 nm, or greater than or equal 800 nm. In some embodiments, the wavelength of light emitted from the source of electromagnetic radiation is less than or equal to 800 nm, less than or equal to 775 nm, less than or equal to 750 nm, less than or equal to 725 nm, less than or equal to 700 nm, less than or equal to 675 nm, less than or equal to 650 nm, less than or equal to 625 nm, less than or equal to 600 nm, less than or equal to 575 nm, less than or equal to 550 nm, less than or equal to 525 nm, less than or equal to 500 nm, less than or equal to 475 nm, less than or equal to 450 nm, less than or equal to 425 nm, less than or equal to 400 nm, less than or equal 375 nm, less than or equal to 350 nm, less than or equal to 325 nm, less than or equal to 300 nm, less than or equal to 275 nm, or less than or equal to 250 nm. Combinations of the foregoing ranges are also possible (e.g., greater than or equal to 250 nm and less than or equal to 800 nm). Other ranges are possible. Those skilled in the art in view of the teachings of the present disclosure will be capable of selecting an appropriate wavelength(s) of incoming light to generate refractive index variations of a desired dimension(s).

In some embodiments, the source of electromagnetic radiation is configured to emit broadband radiation. In certain instances, the source of electromagnetic radiation is configured to emit electromagnetic radiation in a wavelength range spanning at least 350 nm, at least 360 nm, at least 370 nm, at least 380 nm, at least 390 nm, at least 400 nm, at least 500 nm, at least 1 µm, at least 2 µm, or at least 3 µm. In certain instances, the source of electromagnetic radiation is configured to emit electromagnetic radiation in a wavelength range spanning 350 nm to 400 nm, 350 nm to 500 nm, 350 nm to 1 µm, 350 nm to 2 µm, 350 nm to 3 µm, 400 nm to 500 nm, 400 nm to 1 µm, 400 nm to 2 µm, 400 nm to 3 µm, 500 nm to 1 µm, 500 nm to 2 µm, 500 nm to 3 µm, 1 µm to 2 µm, or 1 µm to 3 µm. In some embodiments, the source of electromagnetic radiation is configured to emit white light.

In some embodiments, the source of electromagnetic radiation is configured to emit electromagnetic radiation in a wavelength range spanning at least 350 nm, at least 360 nm, at least 370 nm, at least 380 nm, at least 390 nm, at least 400 nm, at least 500 nm, at least 600 nm, at least 700 nm, or at least 800 nm. In certain instances, the source of electromagnetic radiation is configured to emit electromagnetic radiation in a wavelength range of greater than or equal to 350 nm, greater than or equal to 400 nm, greater than or equal to 450 nm, greater than or equal to 500 nm, greater than or equal to 550 nm, greater than or equal to 600 nm, greater than or equal to 650 nm, greater than or equal to 700 nm, or greater than or equal to 750 nm and less than or equal to 800 nm, less than or equal to 750 nm, less than or equal to 700 nm, less than or equal to 650 nm, less than or equal to 600 nm, less than or equal to 550 nm, less than or equal to 500 nm, less than or equal to 450 nm, or less than or equal to 400 nm. Combinations of the above referenced ranges are also possible (e.g., greater than or equal to 350 nm and less than or equal to 800 nm). Other ranges are also possible.

In some embodiments, the source of electromagnetic radiation is configured to emit electromagnetic radiation in relatively narrow ranges of wavelengths. In some embodiments, the source of electromagnetic radiation is configured to emit electromagnetic radiation in a discrete wavelength range spanning 350 nm or less, 300 nm or less, 200 nm or less, 100 nm or less, 90 nm or less, 80 nm or less, 70 nm or less, 60 nm or less, 50 nm or less, 40 nm or less, 30 nm or less, 20 nm or less, or 10 nm or less. In some embodiments, the source of electromagnetic radiation is configured to emit electromagnetic radiation in a discrete wavelength range spanning 10 nm to 20 nm, 10 nm to 40 nm, 10 nm to 50 nm, 10 nm to 60 nm, 10 nm to 80 nm, 10 nm to 100 nm, 10 nm to 200 nm, 10 nm to 300 nm, 10 nm to 350 nm, 20 nm to 40 nm, 20 nm to 50 nm, 20 nm to 60 nm, 20 nm to 80 nm, 20 nm to 100 nm, 20 nm to 200 nm, 20 nm to 300 nm, 20 nm to 350 nm, 40 nm to 60 nm, 40 nm to 80 nm, 40 nm to 100 nm, 40 nm to 200 nm, 40 nm to 300 nm, 40 nm to 350 nm, 50 nm to 100 nm, 50 nm to 200 nm, 50 nm to 300 nm, 50 nm to 350 nm, 100 nm to 200 nm, 100 nm to 300 nm, or 100 nm to 350 nm.

In some embodiments, the source of electromagnetic radiation is configured to emit electromagnetic radiation in a discrete wavelength range spanning 500 nm or less, 400 nm or less, 350 nm or less, 300 nm or less, 200 nm or less, 100 nm or less, 90 nm or less, 80 nm or less, 70 nm or less, 60 nm or less, 50 nm or less, 40 nm or less, 30 nm or less, 20 nm or less, or 200 nm or less. In some embodiments, the source of electromagnetic radiation is configured to emit electromagnetic radiation in a discrete wavelength range spanning 200 nm to 20 nm, 200 nm to 40 nm, 200 nm to 50 nm, 200 nm to 60 nm, 200 nm to 80 nm, 200 nm to 100 nm, 200 nm to 200 nm, 200 nm to 300 nm, 200 nm to 350 nm, 20 nm to 40 nm, 20 nm to 50 nm, 20 nm to 60 nm, 20 nm to 80 nm, 20 nm to 100 nm, 20 nm to 200 nm, 20 nm to 300 nm, 20 nm to 350 nm, 40 nm to 60 nm, 40 nm to 80 nm, 40 nm to 100 nm, 40 nm to 200 nm, 40 nm to 300 nm, 40 nm to 350 nm, 50 nm to 100 nm, 50 nm to 200 nm, 50 nm to 300 nm, 50 nm to 350 nm, 100 nm to 200 nm, 100 nm to 300 nm, or 100 nm to 500 nm.

In some embodiments, the source of electromagnetic radiation is configured to emit violet light (e.g., light having a peak wavelength in a range of 400 nm to 450 nm), blue light (e.g., light having a peak wavelength in a range from 450 nm to 490 nm), cyan light (e.g., light having a peak wavelength in a range from 490 nm to 520 nm), green light (e.g., light having a peak wavelength in a range from 520 nm to 560 nm), yellow light (e.g., light having a peak wavelength in a range from 560 nm to 590 nm), orange light (e.g., light having a peak wavelength in a range from 590 nm to 635 nm), and/or red light (e.g., light having a peak wavelength in a range from 635 nm to 700 nm). In some embodiments, the source of electromagnetic radiation is configured to emit electromagnetic radiation in a plurality of relatively narrow ranges of wavelengths. In certain instances, the source of electromagnetic radiation is configured to emit electromagnetic radiation in at least 2 discrete ranges, at least 3 discrete ranges, at least 4 discrete ranges, or at least 5 discrete ranges.

In some embodiments, the source of electromagnetic radiation has at least a first portion of the electromagnetic radiation spectrum comprising a wavelength of between greater than or equal to 425 nm and less than or equal to 475 nm (e.g., greater than or equal to 425 nm and less than or equal to 450 nm). In some embodiments, a second portion of the electromagnetic radiation spectrum produced by the source of electromagnetic radiation comprises a wavelength of greater than or equal to 525 nm and less than or equal to 725 nm (e.g., greater than or equal to 600 nm and less than or equal to 725 nm, greater than or equal to 600 nm and less than or equal to 700 nm). In some embodiments, the source of electromagnetic radiation has at least a first portion of the electromagnetic radiation spectrum comprising a wavelength of between greater than or equal to 425 nm and less than or equal to 525 nm (e.g., greater than or equal to 425 nm and less than or equal to 525 nm). In some embodiments, a second portion of the electromagnetic radiation spectrum produced by the source of electromagnetic radiation comprises a wavelength of greater than or equal to 525 nm and less than or equal to 725 nm. In some embodiments, the source of electromagnetic radiation produces white light.

In an exemplary set of embodiments, the source of electromagnetic radiation is configured to emit white light. For example, the source of electromagnetic radiation emits light having a range between at least 350 nm and less than or equal to 800 nm and has a peak in the range of spanning at least 350 nm, at least 360 nm, at least 370 nm, at least 380 nm, at least 390 nm, at least 400 nm, at least 500 nm, at least 600 nm, at least 700 nm, or at least 800 nm. In certain instances, the source of electromagnetic radiation is configured to emit electromagnetic radiation in a wavelength range of greater than or equal to 350 nm, greater than or equal to 400 nm, greater than or equal to 450 nm, greater than or equal to 500 nm, greater than or equal to 550 nm, greater than or equal to 600 nm, greater than or equal to 650 nm, greater than or equal to 700 nm, or greater than or equal to 750 nm and less than or equal to 800 nm, less than or equal to 750 nm, less than or equal to 700 nm, less than or equal to 650 nm, less than or equal to 600 nm, less than or equal to 550 nm, less than or equal to 500 nm, less than or equal to 450 nm, or less than or equal to 400 nm.

The source of electromagnetic radiation may comprise any suitable source of electromagnetic radiation. Examples of suitable sources of electromagnetic radiation include, but are not limited to, light-emitting diodes (LEDs), organic light-emitting diodes (OLEDs), flash bulbs, emissive species (e.g., fluorescent dyes, inorganic phosphors), room lights, and electrical discharge sources. In some cases, two or more sources of electromagnetic radiation are configured to emit electromagnetic radiation in the same range of wavelengths. In some instances, each source of electromagnetic radiation of the plurality of source of electromagnetic radiations is configured to emit electromagnetic radiation in the same range of wavelengths. In some cases, two or more sources of electromagnetic radiation are configured to emit electromagnetic radiation in different ranges of wavelengths. In some instances, each source of electromagnetic radiation of the plurality of source of electromagnetic radiations is configured to emit electromagnetic radiation in different ranges of wavelengths.

In some embodiments, the source of electromagnetic radiation comprises a filter, which may further shape and tune the light emanating from the source of electromagnetic radiation. For example, in some embodiments, a filter may be applied to the source of electromagnetic radiation to narrow the spectral bandwidth of the light emitted from the source of electromagnetic radiation.

In some embodiments, the source of electromagnetic radiation may project light of a particular intensity. In some embodiments, the intensity of the source of electromagnetic radiation is greater than or equal to 100 lumens, greater than or equal to 250 lumens, greater than or equal to 500 lumens, greater than or equal to 750 lumens, greater than or equal to 1,000 lumens, greater than or equal to 2,500 lumens, greater than or equal to 3,000 lumens, greater than or equal to 4,000 lumens, greater than or equal to 5,000 lumens, or greater than or equal to 6,000 lumens. In some embodiments, the intensity of the source of electromagnetic radiation is less than or equal to 6,000 lumens, less than or equal to 5,000 lumens, less than or equal to 4,000 lumens, less than or equal to 3,000 lumens, less than or equal to 2,500 lumens, less than or equal to 1,000 lumens, less than or equal to 750 lumens, less than or equal to 500 lumens, less than or equal to 250 lumens, or less than or equal to 100 lumens. Combinations of the foregoing ranges are also possible (e.g., less than or equal to 6,000 lumens and greater than or equal to 100 lumens). Other ranges are possible.

In some embodiments, the source of electromagnetic radiation is positioned a particular distance from the photonic material (e.g., from a surface of the photopolymer of the photonic material). In some embodiments, the distance of the source of electromagnetic radiation from the photonic material is greater than or equal to 10 cm, greater than or equal to 25 cm, greater than or equal to 50 cm, greater than or equal to 75 cm, greater than or equal to 100 cm, greater than or equal to 250 cm, greater than or equal to 500 cm, greater than or equal to 750 cm, or greater than or equal to 1 meter. In some embodiments, the distance of the source of electromagnetic radiation from the photonic material is less than or equal to 1 meter, less than or equal to 750 cm, less than or equal to 500 cm, less than or equal to 250 cm, less than or equal to 100 cm, less than or equal to 75 cm, less than or equal to 50 cm, less than or equal to 25 cm, or less than or equal to 10 cm. Combinations of the foregoing range are also possible (e.g., greater than or equal to 1 cm and less than or equal to 1 meter). Other ranges are possible.

In some embodiments, an image created or projected by the source of electromagnetic radiation has a particular resolution. In some embodiments, the image resolution is greater than or equal to 640×480, greater than or equal 1024×768, greater than or equal 1152×864, greater than or equal to 1600×1200, greater than or equal to 1920×1080, greater than or equal 2000×1600, greater than or equal 2400×3600. In some embodiments, the image resolution is less than or equal to 640×480, less than or equal 1024×768, less than or equal 1152×864, less than or equal to 1600×1200, less than or equal to 1920×1080, less than or equal 2000×1600, less than or equal 2400×3600. Combinations of the foregoing ranges are also contemplated (e.g., greater than or equal to 640×480 and less than or equal to 2400×3600). Of course, other ranges are possible.

In some embodiments, the source of electromagnetic radiation may provide an image to the photonic material for a particular duration of time (i.e., an exposure time). In some embodiments, the exposure time is less than or equal to 1 minute, less than or equal to 50 seconds, less than or equal to 45 seconds, less than or equal to 30 seconds, less than or equal to 25 seconds, less than or equal to 20 seconds, less than or equal to 15 seconds, less than or equal to 10 seconds, less than or equal to 7 seconds, less than or equal to 5 seconds, less than or equal to 3 seconds, less than or equal to 2 seconds, or less than or equal to 1 second. In some embodiments, the exposure time is greater than or equal to 1 second, greater than or equal to 2 seconds, greater than or equal to 3 seconds, greater than or equal to 5 seconds, greater than or equal to 7 seconds, greater than or equal to 10 seconds, greater than or equal to 15 seconds, greater than or equal to 20 seconds, greater than or equal to 25 seconds, greater than or equal to 30 seconds, greater than or equal to 45 seconds, greater than or equal to 50 seconds, or greater than or equal to 1 minute. Combinations of the above-referenced ranges are also possible (e.g., greater than or equal to 1 second and less than or equal to 1 minute). Other ranges are possible.

The photonic materials described herein may be useful for various applications, including, for example, wearable articles and devices. In an exemplary embodiment, the photonic material is a part of a wearable, color-changing bandage. As the bandage is stretched to be applied to a subject, the color variation observed as a result of the photonic material of the bandage and is a function of the applied strain to the bandage. Thus, the observed color change may indicate if a user (e.g., a clinician) has applied the bandage with a desired amount of force or pressure. Other applications for wearable objects are possible. In some embodiments, a wearable item, (e.g., clothing, footwear, athletic apparel, hats, fashionable objects) comprise a photonic material as disclosed herein. In some embodiments, the photonic material may be fabricated in a roll-to-roll process or using a roll-to-roll system.

In some embodiments, the photonic materials described herein are a part of device. For example, in some embodiments, the photonic materials may be a part of a sensor (e.g., a colorimetric sensor, a force sensor), sensing is correlated with color variations of the photonic material and applied mechanical strain. In some embodiments, the photonic material may be a part of a human computer interaction system or device. In some such embodiments, the photonic material may be a part of or operatively coupled to a robotics system, an artificial intelligence (AI) system, or a machine learning system. By way of illustration, the photonic material may be operatively coupled to an input (e.g., a touch sensor, a fingertip-like function, a mechanical grip, pressure sensitive skin) of the system, wherein the input is correlated to the degree of color variation observed or received from the photonic material. Robotics may also include soft robotics, to provide closed-loop control using the reversible color change. In some embodiments, an augment reality (e.g., virtual reality, VR) system comprises the photonic material or a sensor comprising the photonic material. In some embodiments, the photonic material is a part of an input device (e.g., controller, a keyboard, a mouse, a motion sensor, a trackpad, a touch screen). Other applications are possible.

Exemplary Embodiments

A stretchable, color-tunable photonic material comprising a photo-responsive elastomer optically patterned with nanoscale refractive index variations, and a silicone backing; the photonic material exhibits reversible color variation under applied tensile or compressive mechanical strain; any desired color pattern or image may be generated in the material; the final material may exhibit specular reflectance or diffuse reflectance, depending on the choice of reflective backing during manufacture (the reflective backing is a manufacturing feature not a feature of the final material); in other words, for each spatial location (pixel) on these photonic sheers, the reflected spectrum (color) and the angular range in which the color from this pixel is reflected (specular, isotropically diffuse, or anisotropically diffuse) may be tailored.

The technique with which the material is made advantageously uses a previously unexplored niche between holography and Lippman photography (a century-old photography approach that earned Lippmann the Nobel Prize in 1908).

Generally, spatially incoherent light (e.g., as opposed to coherent light in holography) is used to create a standing wave pattern in the photo-developable elastomer that is backed by a rough reflector (as opposed to a smooth mirror in Lippmann photography). In some embodiments, this creates periodic refractive index variations in the photo-responsive elastomer on the scale of a few 100-nm (essentially a multilayer with alternating high and low refractive index). The thickness of the multilayer structure is generally related to the temporal coherence length of the exposing light (e.g., these structures may be several 10's of microns thick, meaning that a large number of refractive index undulations may be formed in the structure). A simple projector may be used, in some cases, to create periodically varying refractive index structures that reflect blue light if the exposing light was blue, green light, if the exposing light was green, and red light, if the exposing light was red (this holds for any other color of the exposing light but red, green, blue may be used to mix any color anyway). The generated structure, in some embodiments, follows the roughness profile of the backing reflector used during manufacture and generally has the same light scattering characteristics (e.g., same angular reflection profile but now with any desired color). The reflecting layer may be used in the manufacturing procedure in some embodiments, but is optionally present in the material's final form Nobody skilled in the art of holography or Lippman photography would have chosen the combination presented herein. For example, in holography spatially coherent light is generally essential; Lippman photography generally works with smooth mirror surfaces (e.g., Lippmann used a pool of liquid mercury for the smoothest possible surface). In some embodiments, spatially incoherent light is combined with a rough back reflector and create the standing wave patterns in a photo-responsive elastomer. It is not known that this has been done before nor would this combination be straightforward to deduce to those skilled in the art.

Advantageously, the material described herein goes way beyond anything out there in terms of spatial control of the color patterns, control over its angular scattering characteristics, and/or the achievable dynamics.

In an exemplary embodiment, a photonic material is described, comprising a photopolymer layer; a backing layer adjacent the photopolymer layer; and optionally, a reflection layer associated with the photopolymer layer, wherein the photonic material exhibits reversible color variation under applied mechanical strain.

In an exemplary embodiment, a photonic material is described, comprising a photopolymer layer comprising a photo-responsive elastomer optically patterned with nanoscale refractive index variations; and optionally, a backing layer adjacent the photopolymer layer, wherein the photonic material is deformable and wherein the photonic material exhibits reversible color variation under applied mechanical strain.

In some embodiments, the photopolymer layer comprises a photo-responsive elastomer. In some embodiments, the photopolymer layer comprises a plurality of nanoscale refractive index variations. In some embodiments, the nanoscale refractive index variations are patterned. In some embodiments, the backing layer comprises silicone. In some embodiments, the photonic material is capable of generating a color pattern or image in the photonic material. In some embodiments, the photonic material exhibits specular reflectance and/or diffuse reflectance. In some embodiments, spatially incoherent light is used to generate a standing wave pattern in the photopolymer layer. In some embodiments, the reflection layer has a roughness such that periodic refractive index variations in the associated photopolymer layer are greater than or equal to 100 nm and less than or equal to 1000 nm.

Any terms as used herein related to shape, orientation, alignment, and/or geometric relationship of or between, for example, refractive index variations, combinations thereof and/or any other tangible or intangible elements not listed above that are amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, alignment, and/or geometric relationship include, but are not limited to terms descriptive of: shape—such as, round, square, circular/circle, rectangular/rectangle, triangular/triangle, cylindrical/cylinder, cone/conical, elliptical/ellipse, (n)polygonal/(n)polygon, U-shaped, line-shaped, etc.; angular orientation—such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; arrangement—array, row, column, and the like. As one example, a fabricated article that would be described herein as being " square" would not require such an article to have faces or sides that are perfectly planar or linear and that intersect at angles of exactly 90 degrees (indeed, such an article may only exist as a mathematical abstraction), but rather, the shape of such article should be interpreted as approximating a " square," as defined mathematically, to an extent typically achievable and achieved for the recited fabrication technique as would be understood by those skilled in the art or as specifically described. As another example, refractive index variations that would be described herein as being in an "array" would not require such variations to have centers that are perfectly arranged in row and columns in which all major axes of the variations are aligned (indeed, such an array may only exist as a mathematical abstraction), but rather, the arrangement of such variations should be interpreted as approximating an "array", as described mathematically, to an extent typically achievable and achieved for the recited fabrication technique as would be understood by those skilled in the art or as specifically described. Additionally, while the arrays described herein relative to the figures and examples are regular arrays with a repeating pattern of refractive index variations formed in a photopolymer layer, the use of irregular arrays of variations that are not arranged in a periodic and/or symmetrical arrangement are also contemplated as the disclosure is not so limited.

The following examples are intended to illustrate certain embodiments of the present invention, but do not exemplify the full scope of the invention.

EXAMPLE 1

Micro- and nano-structured material morphologies with dynamic optical properties, such as mechano-responsive structural coloration may be well suited for optical sensing and visual information transfer in healthcare applications, mechano-sensing, product design, and augmented reality, as non-limiting examples. However, one impediment to pervasive utilization of such dynamic optical materials is the lack of scalable manufacturing strategies. Controlling a material's nano-scale morphology across macro-scale areas with adequate spatial control of its reflection spectrum and light scattering characteristics has proven to be a formidable challenge. However, here, a scalable manufacturing approach for large area photonic sheets is reported with a rich and easily controlled design space of spatial color patterns, spectral signatures, angular scattering characteristics, and response to mechanical stimuli. The approach represents a departure from Lippmann's color photography technique for which he received the Nobel-prize in 1908. Relying on standard projector, commonly available photosensitive elastomers, and a reflective surface, this approach is easily, and cost-efficiently implemented in industrial settings, at-home manufacturing, or educational laboratories. Devices for touch-sensing in augmented reality devices and machine-assisted object manipulation as well as mechano-sensitive healthcare materials are described, which may lead to a wealth of potential new applications that capitalize on information transfer with dynamic structural colors.

Photonic materials are ubiquitous in the natural world, causing vibrant structural colors in many animals and plants. Photonic materials may harness nano-scale periodic variations of refractive index to shape the propagation of light, filtering it spectrally and modifying its direction. These materials may play important roles in modern technology, ranging from lasers, LEDs, photonic-crystal fibers, and optical coatings to biosensing applications and display technology. Soft deformable photonic materials capable of responding to mechanical stimuli with a predictable change in their optical appearance have recently gained significant interest in materials research and engineering with several studies indicating their potential merit for new sensing and information transfer strategies in healthcare, diagnostics, consumer product design, and augmented reality devices.

A variety of strategies exist for the formation of mechano-responsive soft photonic materials. Elastically deformable sheets and fibers of squishy opals have been formed by extrusion and shear-induced ordering of colloidal particles with a hard core and a soft shell. While scalable, this technique does not provide spatially resolved control over the material's optical properties and requires the large-scale synthesis of highquality colloidal particles and shear-based post-processing of the extruded materials to reduce the prominence of regions of disorder in the colloidal structure that adversely affect the optical performance. Formation of direct and inverse opals assembled by evaporation-based techniques is challenging to scale although a few viable strategies exist; and while these photonic materials may be responsive to different stimuli, their mechanical properties are usually not ideal to sustain a mechanical tuning.

Cellulose-based photonic laminates, which may be produced with scalable roll-to-roll processing strategies also require the presence of water. However, while they show impressive responsiveness to compressive stresses, they are not ideal for tensile deformations and have limitations in response time. Furthermore, spatial control of the materials spectral reflection characteristics and scattering behavior is difficult to achieve. Magnetic field-induced self-assembly of magnetic nanoparticles in a polymer matrix may be accomplished with a wide choice of material compositions, resulting in structures with tunable mechanical properties, but the high material cost and fabrication complexity, limited range of realizable photonic structures, and trade-offs in optical performance due to light absorption are challenging the broad adoption of these materials.

Block copolymer self-assembly may be applied to form photonic materials but suffers from the high cost and limited scalability associated with the synthesis of specialty block copolymers, and restrictions in material composition and physical properties. Direct assembly methods have also been demonstrated, including two-photon polymerization followed by shrinking, sequential spin coating and multilayer rolling, laser interference lithography, and direct-write assembly. While these methods offer different levels of control over the photonic architecture, they are subject to limitations around fabrication complexity, scalability, or equipment costs.

In essence, existing techniques are either good at controlling structure and structural hierarchy on the local level but face serious scaling problems, or they are scalable but don't provide the control of material structure needed to achieve the desired dynamic opto-mechanical properties. Thus, an approach that offered nano-scale structure control with an economic implementation on an industrial scale remained elusive, despite a number of high-impact applications. In particular, colorimetric sensing strategies are an application field that could be greatly advanced by the wide-spread availability of mechano-responsive soft photonic materials. The output of such sensors may be interpreted by both biological and computer vision, allowing the development of both analog and digital devices.

In contrast to these existing techniques, it has been discovered within the context of the present disclosure a new technique for fabricating mechano-responsive soft photonic materials with widely available equipment and base materials, which not only solves cost and scaling issues of these existing approaches but also opens up a rich and easily controlled materials design space, which was previously unattainable with any competing technique. Light-induced generation of photonic nanostructures in conventional, commercially available photo-responsive elastomers with microscale lateral resolution in macroscale stretchable sheets is demonstrated. The approach described here and elsewhere herein permits fine spatial patterning of different optical and mechanical properties across the material, access to the full RGB color space including purples and white—exclusively based on structural colors—near-infrared printing, and a choice between specular or diffuse reflection.

The approach is a departure from the pioneering color photography work of Gabriel Lippmann, for which he won the Nobel Prize in Physics in 1908. Lippman photography relies on encoding information of a scene by creating a standing wave pattern in a photosensitive material between incoming light and light reflected by a mirror backing. Lippmann used mercury to provide superior mirror flatness and intimate contact with the photo-responsive material.

By using spatially incoherent light originating from a standard image projection system and shaping the standing wave patterns generated in elastomeric photo-sensitive materials through the use of tailored, corrugated mirror surfaces to control the resulting photonic structure's scattering characteristics, the approach described herein is distinctly different from standard holography approaches that utilize spatially coherent light and from Lippmann's technique, who relied on flat mirrors and thereby passed on a unique chance to control diffusivity and color constancy of the resulting images, as has been discovered and appreciated by this disclosure as described below and elsewhere herein.

Re-Interpreting Lippmann Photography to Embed Photonic Structures in Elastomers

Lippman relied on the observation that light from a broadband, incoherent source forms an optical standing wave in the vicinity of, and parallel to, a reflective surface. When a sheet of light-sensitive material is placed adjacent to that surface, the standing wave may be recorded as a periodic variation in refractive index. These periodic variations, a type of one-dimensional photonic crystal, also known as a distributed Bragg reflector (DBR), reflect a specific part of the spectrum as a function of the structure's periodicity, in turn defined by the wavelength of the light used to create these periodic variations. The technique described herein extends Lippmann's concept to elastic light sensitive materials, which allow the photonic structures to be reversibly deformed and thereby shifting the reflected wavelength. A sheet of holographic recording material may be positioned against a reflective surface and expose it to the image created by a source of electromagnetic radiation, such as a standard desktop projector.

Requiring no precision optics or vibration isolation, this approach may be implemented and scaled in a wide array of laboratory or manufacturing environments. With our standard desktop projector the recording time is between seconds and minutes. The exposure time is dependent on the power of the source of electromagnetic radiation and the size of the exposed area in which the patterns are recorded. It is anticipated that current exposure times could be further reduced by using higher-power projection systems, as the exposure times scales inversely with light exposure level. While there are a multitude of suitable holographic recording materials available, the Litiholo C-RT20 photopolymer was used in this example, which is highly and reversibly stretchable and may be used without further modification. This photopolymer bonds well to silicone after short exposure to oxygen plasma, allowing adhesion to structured silicone substrates that provide mechanical support and may act as an optically absorbing backing layer to enhance saturation of the reflected dynamic colors while preserving the reversible, extreme deformability of the photopolymer.

Figure 3A:
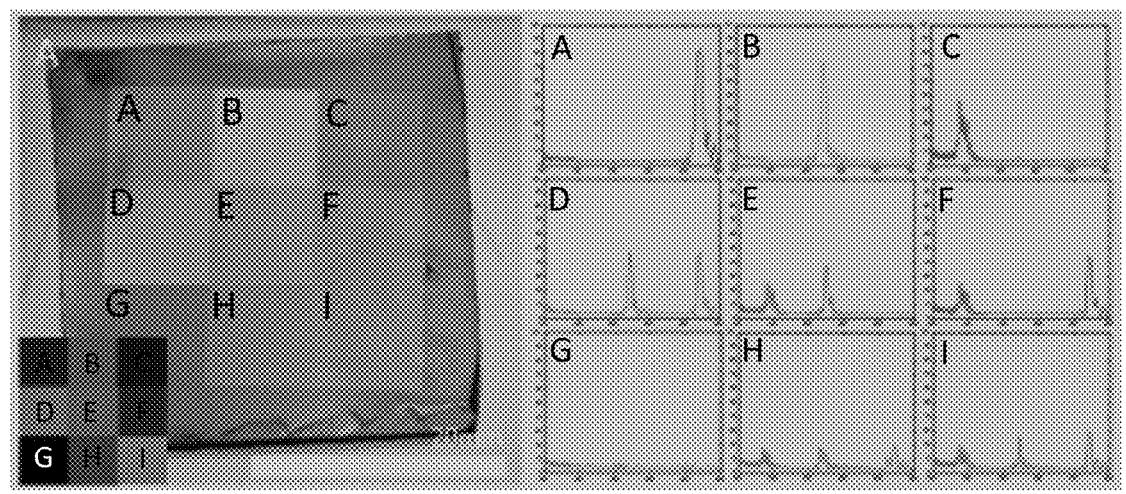
FIG. 3A are photographic images and plots showing the effect of modifying the projected image and/or the silicone backing layer, where the panel on the left is a sample of material showing the range of possible colors and greyscale values, with the inset showing the original projected image and the panel to the right showing the corresponding reflectance spectra for each of the nine color regions in the sample, according to one set of embodiments.

A Rich Design Space to Control the Material's Optical and Mechanical Performance The design space enabled with this technique features multiple, controllable parameters that determine the optical and mechanical properties of the final material and open up a wide range of visual appearances, spatio-spectral patterns, angular scattering profiles, and opto-mechanical response strengths. Some important parameters may be organized into three categories according to whether they (1) modify the light pattern projected onto the photopolymer, (2) affect the characteristics of the reflective backing used to define the standing wave pattern in the light-sensitive elastomer, or (3) structure the silicone backing layer to tailor the material's response to applied strains. Tailoring the photonic material's spatial and spectral reflection characteristics As in Lippmann photography, the projected light pattern's spatial color distribution defines the spatial variations of the period of refractive index variations that are generated in the photo-responsive elastomer. The periodicity of the optically embedded structures in turn determines the reflected color, at each location on the sheet. To demonstrate the range of available colors and greyscale values, a nine-square test image was fabricated containing red, green, and blue (primary colors), yellow, cyan, and magenta (secondary colors), and black, grey, and white, as shown in FIG. 3A. High single-peak reflectivity was consistently observed with up to 95% of incident light in the primary color regions that match with the RGB spectrum of the projector Akin to RGB displays, secondary colors and grey-scale shades are achieved by superposition of spectral features located in the RGB primary color spectral ranges.

For secondary colors, it was observed that the integrated reflectivity between 450 nm and 650 nm matches with the levels obtained for primary colors (95%), yet the reflected light intensity is distributed across two or three separate peaks according to the ratio of red, green, and blue in the projected image. It is hypothesized that this corresponds to a weighted superposition of distributed Bragg reflectors with different periodicities. The approach also allows for the creation of structural whites and grays as a spectral superposition of red, green, and blue in appropriate proportions.

Figure 3B:
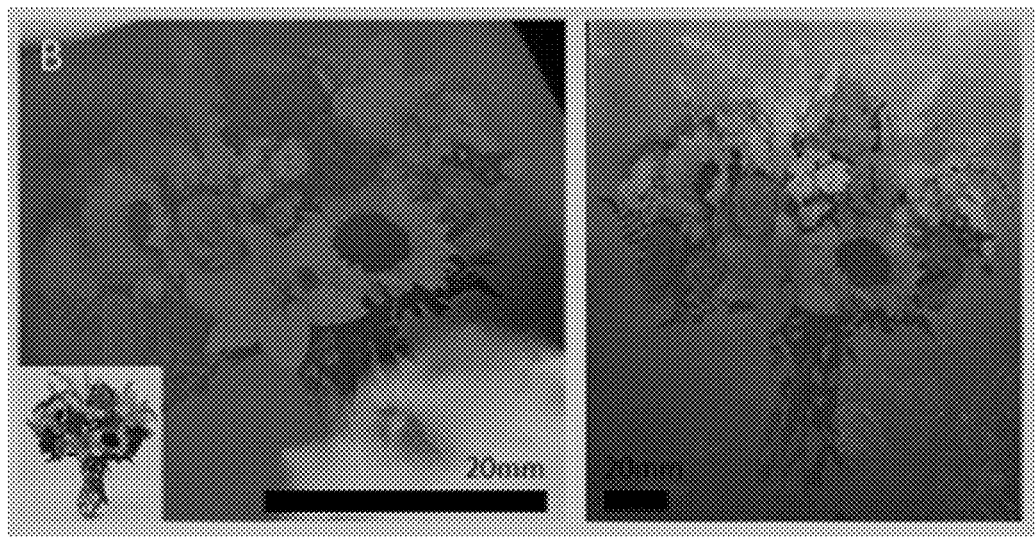
FIG. 3B are photographic images showing the effect of modifying the projected image and/or the silicone backing layer, where the panel on the left is a sample of material showing a more complex pattern, produced by projecting the image of flowers shown in the inset on to a photopolymer and, by adjusting the optics of the projector, the overall size of the sample may be tuned with a tradeoff of the larger the projected image having a lower the spatial resolution, according to one set of embodiments.
Figure 3C:
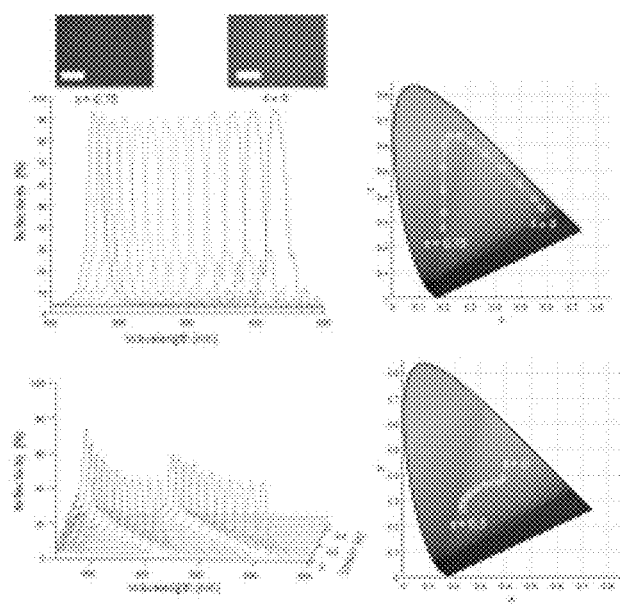
FIG. 3C are photographic images showing the effect of modifying the projected image and/or the silicone backing layer showing how the color of the material changes as the material is deformed with the graphs showing how the reflectance spectrum changes with applied tensile strain, using red and yellow regions as an example, which may be further visualized by converting each measured spectrum to a point in the CIE 1931 color space and inset images showing a magnified image of the material, according to one set of embodiments.
Figure 3D:
FIG. 3D are photographic images showing the effect of modifying the projected image and/or the silicone backing layer illustrating how stretching the material sample containing the flower pattern causes each point to change color, moving from the starting color towards the blue end of the spectrum, according to one set of embodiments.

Having shown a high degree of control over the colors generated, the spatial patterning ability of this technique was also demonstrated by generating structural color analogs of projected images with demanding spatio-spectral intensity distributions, such as a vase of flowers, as illustrated in FIG. 3B. The resolution of the generated patterns and the overall area of a structurally colored image is easily adjustable by tuning the projector resolution, throw ratio, and projection distance. For example, a projector with a 1920×1080 resolution, a throw ratio of 1, and projecting at a distance of 50 cm produced a 50 cm by 28 cm image with an individual pixel width of roughly 26 µm, which may be scaled by simply changing the distance between the photo-responsive film and the projector. For miniaturized images with high spatial resolution a short focal length lens may be added in front of the projector.

Figure 2A:
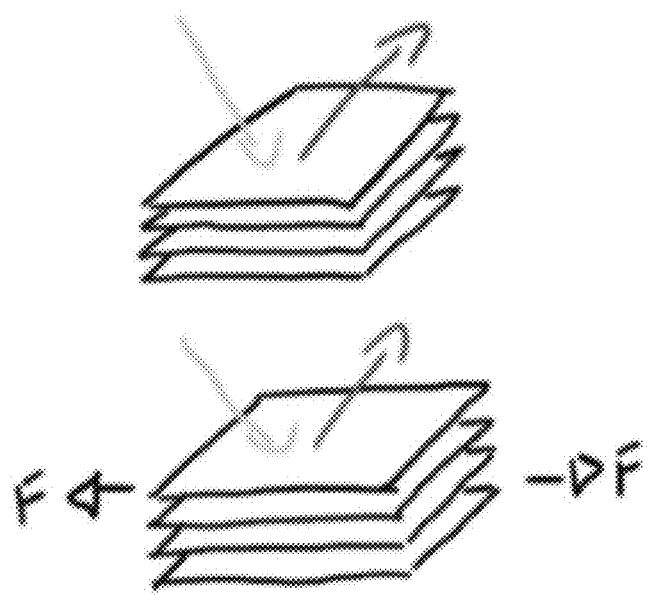
FIG. 2A schematically illustrates the optical concept underlying the mechanoresponsive material, and a fabrication technique, showing one example of a simple photonic structure, which is the distributed Bragg reflector (DBR), a periodic variation of refractive index in one dimension which exhibits selective reflectivity of specific wavelengths of light as a function of layer thickness and refractive index contrast, according to some embodiments.
Figure 2B:
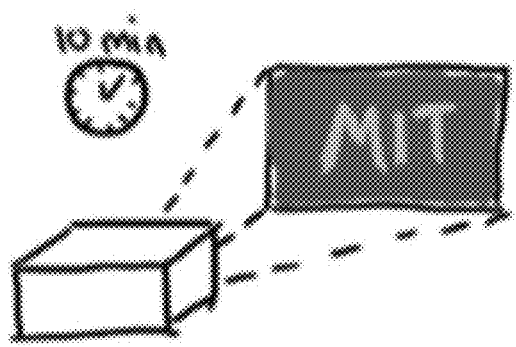
FIG. 2B schematically illustrates the optical concept underlying the mechanoresponsive material, illustrating when light, in this case from a desktop projector, is reflected from a metallic surface it forms a standing wave close to that surface, and the standing wave may then be recorded by a high-resolution light-sensitive material, for example holographic recording materials, according to some embodiments.
Figure 2B:
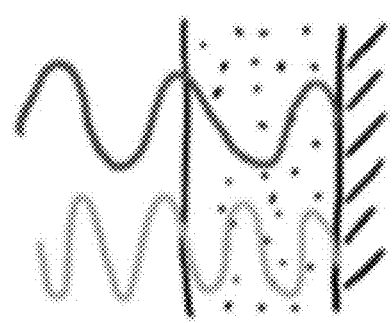
Figure 2C:
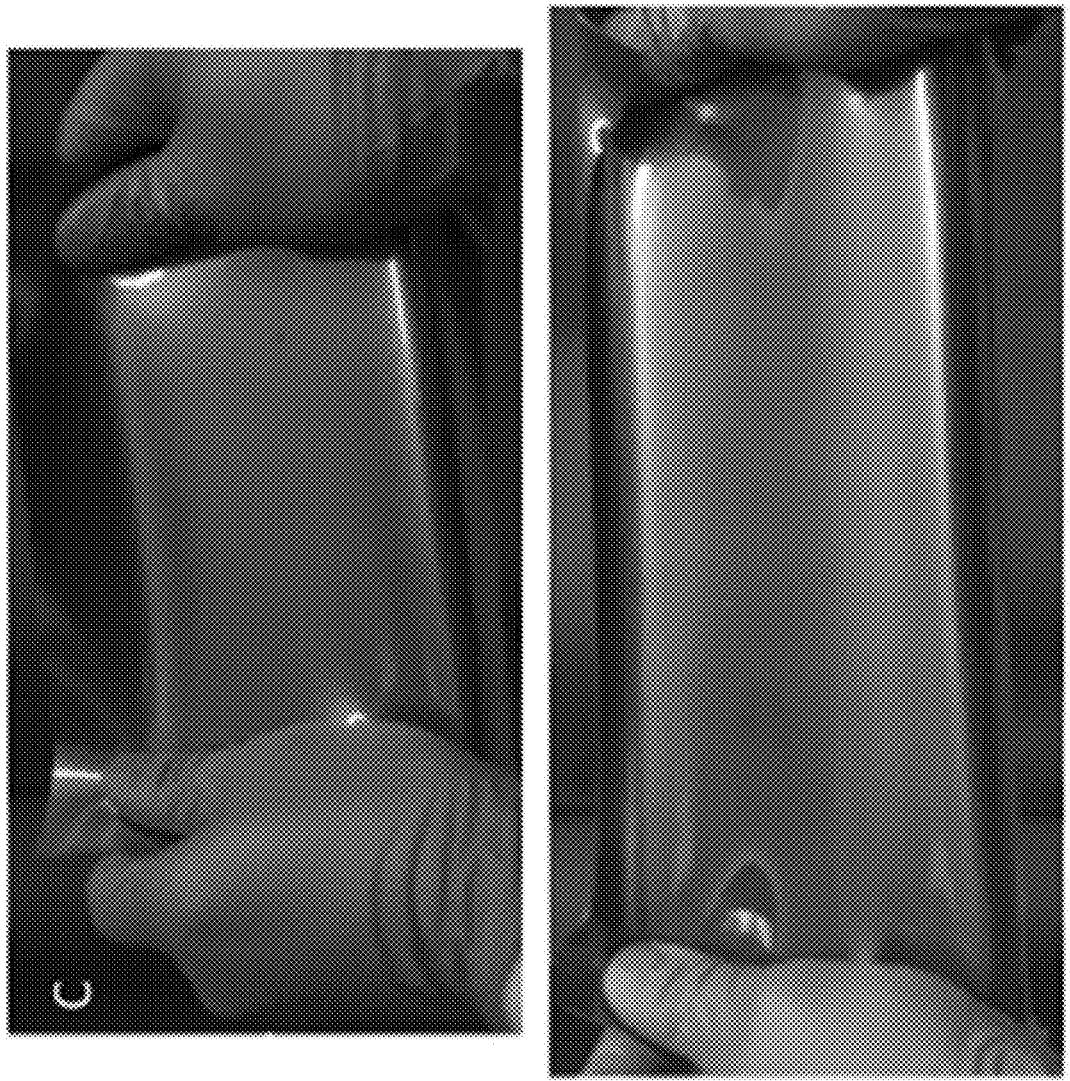
FIG. 2C schematically illustrates the optical concept underlying the mechanoresponsive material, illustrating how the recorded standing wave then acts as a DBR, reflecting the same wavelength of light that was used to create it and when the recording material is deformed, so is the embedded DBR, causing the reflected wavelength to shift, according to some embodiments.

The high deformability of the photo-responsive elastomer sheets enables a key feature of this material: the material's color-tuning under deformation, illustrated in FIG. 2C. Using a custom-built measurement setup that integrates a tensile tester, spectrometer, and inverted microscope, a predictable shift in the spectral reflectance peaks as a function of applied strain is observed, which is caused by the strain-induced periodicity variation in the distributed Bragg reflector structure. The material's strain-dependent color travel may then be visualized by mapping each measured reflectance spectrum to a point in the CIE 1931 color space, corresponding to the color perceived by an observer. For primary color regions, this strain results in a smooth trajectory around the outside of the color space, which represents pure colors. The color trajectories observed when secondary color regions are deformed are more passing in a closer proximity to the CIE white point, since multiple receptor types are stimulated in the human eye simultaneously. The diversity of the landscape of deformation-driven color trajectories achieved with this fabrication technique may clearly be seen in the flower image as it is subjected to increasing amounts of strain, where different original colors follow unique color space trajectories.

Tailoring the Photonic Material's Opto-Mechanical Response

Figure 3E:
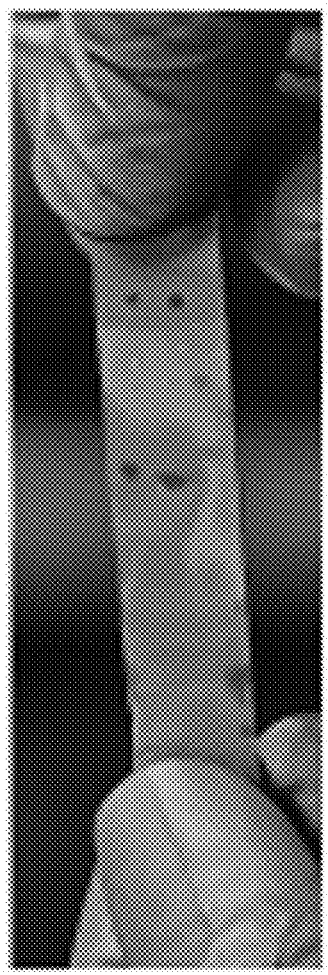
FIG. 3E are photographic images showing the effect of modifying the projected image and/or the silicone backing layer, which shows that, by changing the elastic modulus or thickness of the silicone backing layer, the material may be tuned to change color over a desired range of forces, in this case, by spatially patterning the thickness of the silicone backing layer, different regions will be strained by different amounts when a force is applied, according to one set of embodiments.
Figure 3E:
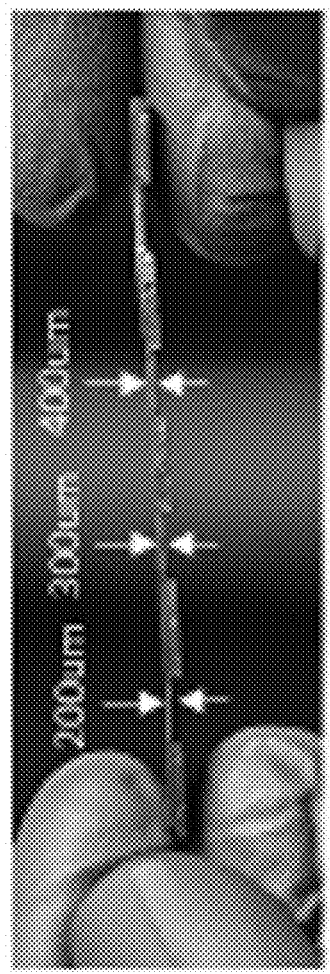
Figure 3E:
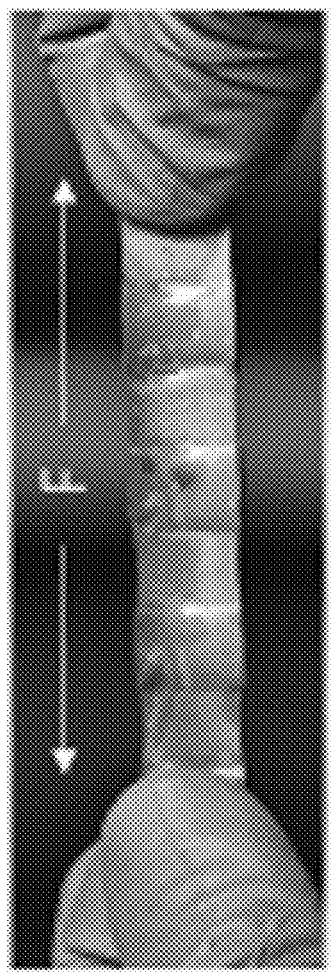

The material's mechanical and optical response to an applied stress, including the magnitude of color variation in specific spatial locations may be tailored through the design of the silicone backing layer. As the color change is a function of strain, the elastic modulus or thickness of the silicone backing layer may be varied to map a specific externally applied range of force to a desired spatial distribution of strain, allowing the prioritization of either the dynamic range or sensitivity. One controllable parameter is the local thickness of the backing layer. For a given magnitude of externally applied tensile forces, the stress experienced locally in the material scales inversely with the local backing layer thickness. Thinner areas thus experience larger strains and consequently more significant color variations than thicker ones. 3D-printed molds were used to imprint thickness variations when the backing layer is cast onto the photo-developed elastomer. This allows us to generate a rich variety of spatial variations in the backing layer thickness. A photonic sheet with tailored backing layer thickness variation that is homogenously colored in its relaxed state will display color patterns when strained, as illustrated in FIG. 3E.

Tailoring the Photonic Material's Scattering Characteristics by Shaping the Standing Wave Another important parameter in the material's design space is influencing its optical characteristics during fabrication the reflecting surface. In Lippmann photography, this surface is simply a planar mirror in very close proximity behind the photo-responsive material, which usually is arranged normal to the incident light leading to a standing wave with wavefronts parallel to the material surface. By contrast, here the optical exposure to a light pattern produces a distributed Bragg reflector within the photo-responsive material with a periodicity corresponding to the wavelength of the incident light, as explained above. However, when the mirror is tilted, the propagation vectors of the incident and reflected light waves are not in alignment anymore and the wavelength of the standing wave in the film increases relative to the wavelength of the incident light, while remaining parallel to the reflecting surface. This allows for the rotation of the orientation of the distributed Bragg reflectors within the film and for generations of patterns that reflect at wavelengths longer than the wavelength of the light used to fabricate them.

To demonstrate this effect, photo-responsive sheets at a 60° angle with a uniformly red image were used to fabricate a mechano-responsive material, as schematically illustrated in FIG. 3A. When observed at normal incidence, these sheets reflect in the near-infrared region of the spectrum in their unstrained state; their reflection peak gradually shifts into the visible spectrum when the sheets are deformed. Positioning the mirror backing at an incline with respect to the source of electromagnetic radiation and to the photo-responsive material is thus a versatile parameter in the design space.

Figure 4A:
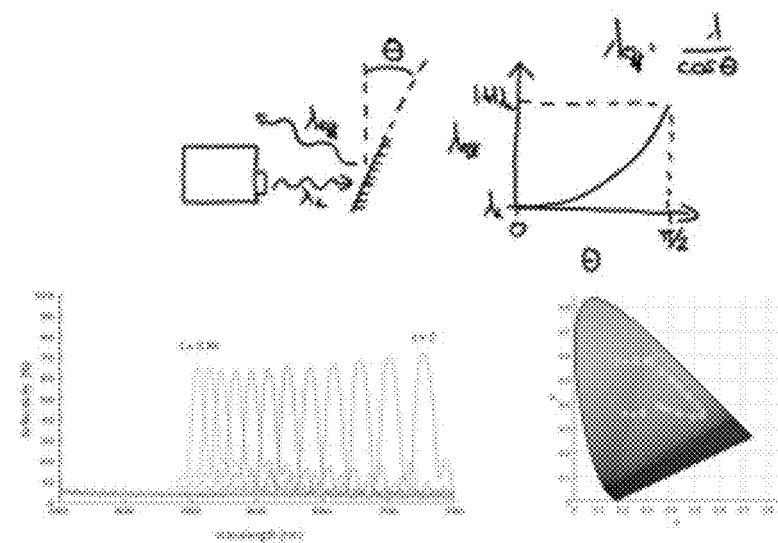
FIG. 4A shows the effect of modifying the reflective surface where, during fabrication, if the incident light is reflected at an angle the wavelength of the standing wave is increased, and the plot on the top right shows how the wavelength of the standing wave is a function of the wavelength of the incident light and the reflection angle, which has been demonstrated by creating a sample of the photonic material using red incident light, centered at 640 nm, exposed at a 60-degree angle where the spectrum shows that at normal incidence it reflects in the near-infrared, and under strain the wavelength shifts into the visible range; according to some embodiments.
Figure 4B:
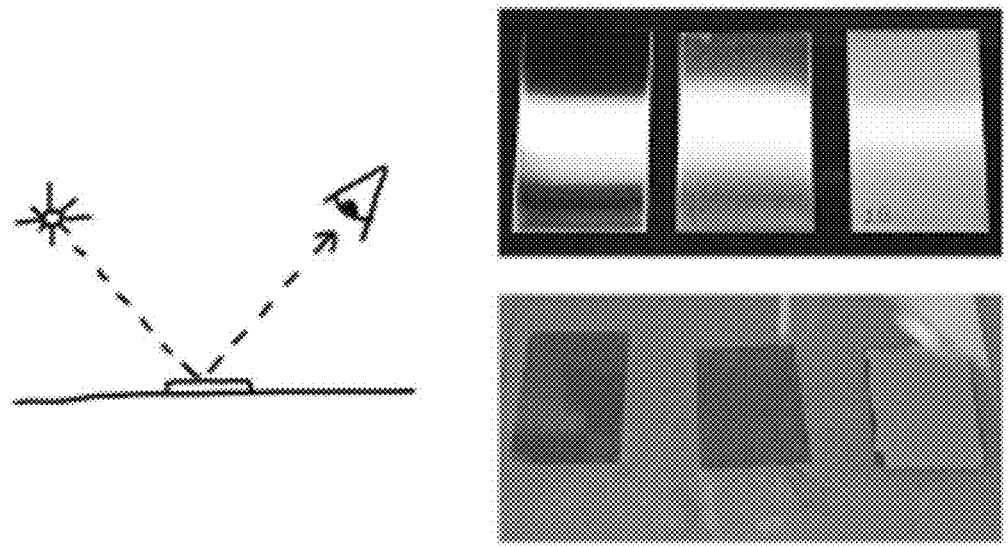
FIG. 4B shows the effect of modifying the reflective surface where, under illumination by a point source, observed as shown on the left panel, the qualitative difference in optical properties of three standard stainless-steel finishes may be seen—#8 (mirror finish), #4 (coarse brush), and #2B (unfinished), each one showing an increasing amount of diffuse reflection, and when these materials are used as the reflective surface, the resultant photonic material also exhibits a corresponding amount of diffuse reflection, according to some embodiments.
Figure 4C:
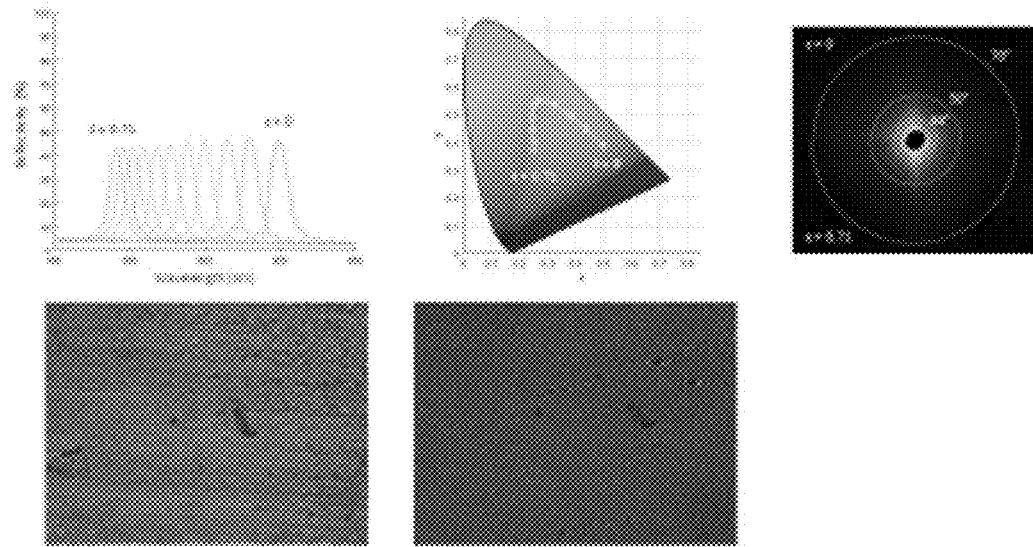
FIG. 4C shows the effect of modifying the reflective surface where when #2B (unfinished) stainless-steel is used as the reflective surface, which has a relatively isotropic angular distribution of reflected light, the overall amount of reflected light is largely conserved, but it is now reflected primarily within a 100-degree cone while maintaining the reflected color, and this is preserved while straining or deforming the material, in combination with the expected color shift, according to some embodiments.
Figure 4D:
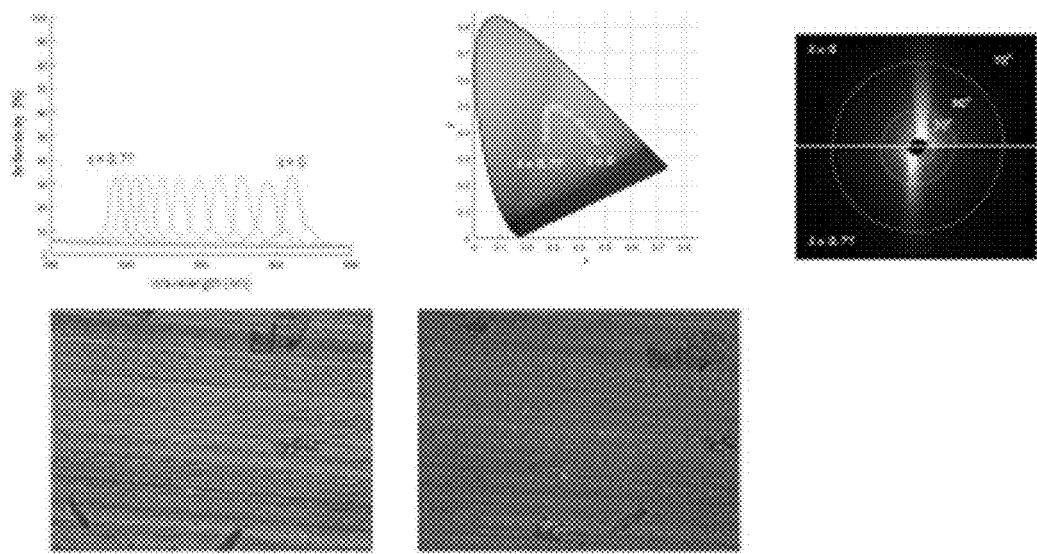
FIG. 4D shows the effect of modifying the reflective surface where the outcome is similar when using #4 (coarse brushed) stainless-steel, but the light is now only diffusely reflected perpendicular to the grain, according to some embodiments.

The texture of the reflecting surface is another valuable design parameter affecting the material's optical properties. A smooth mirror enables the generation of Bragg reflector structures in the material that exhibit structural color with specular reflection. In many cases, however, it may be preferable to have a material that provides diffuse structural color reflection to be perceived in a wider range of viewing angles, and ensures reduced dependency on illumination conditions, removing the image of the illuminating scene from the reflection thereby providing more uniform color. By replacing the smooth mirror with a textured reflector, such as brushed aluminum or unfinished stainless steel, it is possible to reproduce the reflector's angular distribution of reflected light within the structurally colored material, illustrated in FIG. 4B. For example, with a #2B stainless steel reflector, sheets, which isotropically reflects spectrally filtered light in a 100° cone, shown in FIG. 4C. A reflector made from #4 brushed aluminum, which has a visible grain in one direction, produces a structurally colored material which anisotropically reflects scatters light in a 140° arc perpendicularly to the grain, and reflects specularly parallel to the grain, as shown in FIG. 4D.

Controlling the scattering characteristics of the optically manufactured photonic materials is unique to the approach described herein and is possible by using incoherent light, as that limits the formation of photonic structures to the vicinity of the reflective surface, following its profile. By contrast, it is believed that if coherent light were used instead, it would result in a complex combination of multiple interference patterns throughout the entire volume of the material.

Applications

Figure 5A:
FIG. 5A illustrates that by applying the photopolymer layer to other materials, for example woven bandages, the strain applied to the underlying material may be visualized as color change, according to some embodiments.
Figure 5A:

In some cases, applications for these materials may be organized into two categories, which are referred to here as analog and digital. In the analog case, the observer is the human eye. Examples of this include color-changing bandages (shown in FIG. 5A), a scalable, lower-cost implementation that allows medical professionals to consistently apply the correct amount of strain when, for example, wrapping a compression bandage. This is achieved by directly bonding the photopolymer layer to different materials, in this case a woven bandage, using flexible silicone adhesive dyed with a black pigment. This allows the amount of strain applied to the underlying material to be visualized as color change.

Figure 5B:
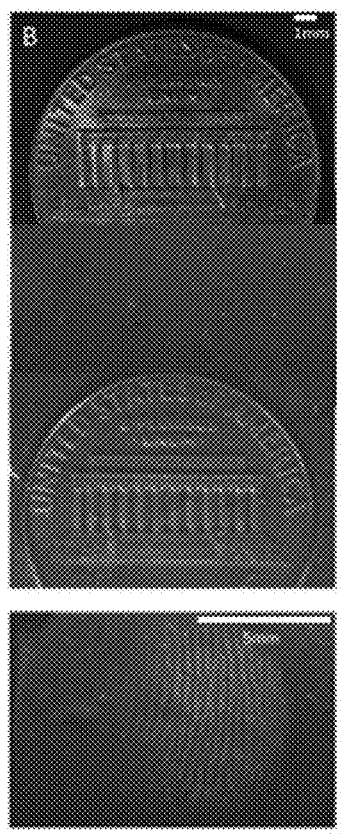
FIG. 5B shows that the material also works under compressive strain, providing detailed maps of the applied forces across an area, and this works with both hard and soft objects, such as coins and fingertips, respectively, according to some embodiments.
Figure 5C:
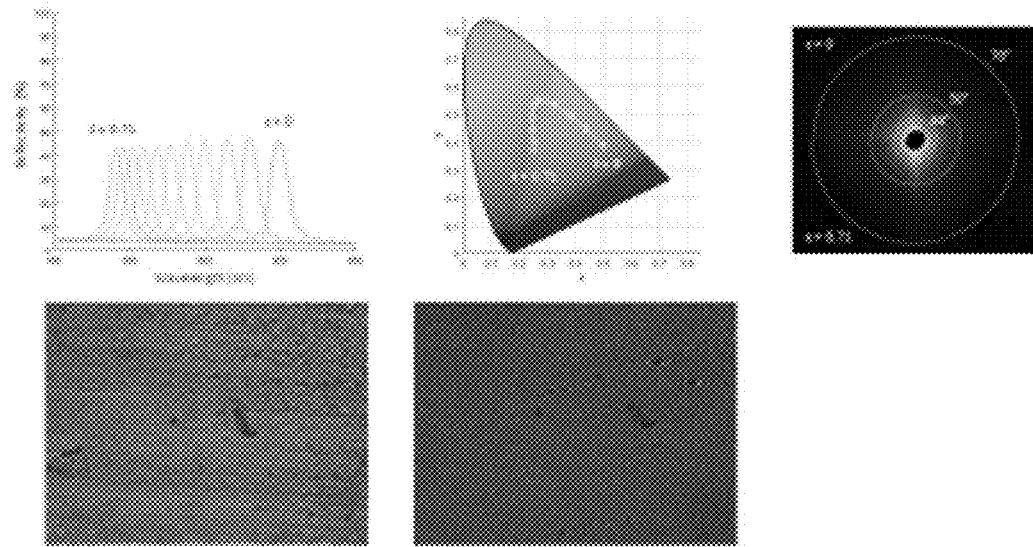
FIG. 5C is a sketch of the general device concept for a high-resolution spatial mapping force sensor, created by affixing the material to a molded clear silicone core and embedding a miniature camera and source of electromagnetic radiation, according to some embodiments.
Figure 5D:
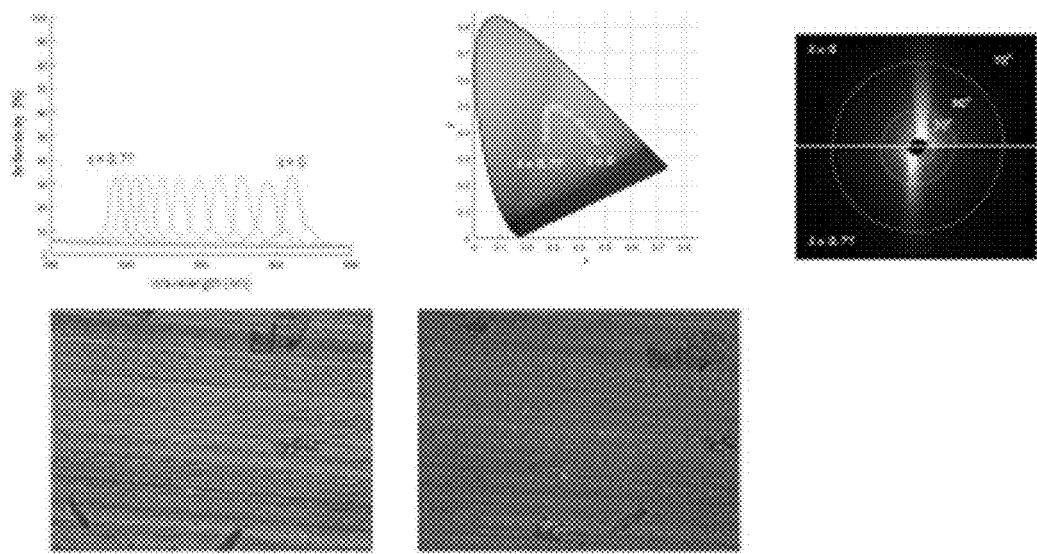
FIG. 5D shows the detecting force maps based on human touch may be used to create new input devices for human-computer interaction, according to some embodiments.

The second application category instead uses digital imaging systems as the observer, rather than a human. As this material also functions under compressive strain as well as tensile strain, it may provide a spatial map of the forces applied at each location on the material, represented by local color change, as shown in FIG. 5B. This may be demonstrated by laying the material against a hard, clear substrate to provide mechanical resistance, such as a glass slide, and pressing a coin into the silicone backing layer. Given the sensitivity of this material, it's also possible to observe soft objects pressed into the silicone backing layer such as a human finger. By combining this capability with advances in low-cost, miniaturized digital imaging systems, driven in a large part by the rise of smartphone cameras, a low-cost high-resolution spatial-mapping force sensor may be fabricated, which enables a number of new opportunities, some of which are shown in FIG. 5C. The first of these is a new type of touch-sensitive input device for human computer interaction, shown in FIG. 5D. By molding a soft, silicone core, adhering a layer of the material to the surface, and embedding a camera, all deformations of the device by the user's fingers may be observed. This effectively creates a touchpad which may be fabricated in any shape, with passive, haptic feedback, capable of force sensitive multi-touch. The second opportunity involves combining such a sensor with a robotic gripper, enabling the gripper to perceive a detailed force map when holding objects, potentially useful for both picking up delicate or soft objects, as well as allowing the possibility of object classification based on surface morphology. For both of these applications, the computational cost of image analysis is low as the force information is directly encoded as color, allowing a high sample rate and low latency. Use of the diffuse-reflection version of this material further simplifies the image analysis as the contents of the illuminating scene is removed from the captured image, and also simplifies device design as constraints on the illumination conditions are simplified. Additionally, the sample rate and resolution of such a device is primarily governed by the image sensor—based on currently available sensors, this provides upwards of a million separate points of force data at hundreds of frames per second.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" may refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A photonic material, comprising:
  a photopolymer section comprising a plurality of optically-patterned refractive index variations which correspond to a pattern of electromagnetic radiation reflected from a textured surface; and
  a backing layer adjacent to the photopolymer section,
  wherein the photonic material exhibits reversible color variation under applied mechanical strain.

2. The photonic material of claim 1, wherein the plurality of optically-patterned refractive index variations comprises a first set of refractive index variations and a second set of refractive index variations distinct from the first set of refractive index variations.

3. The photonic material of claim 1, wherein the plurality of optically-patterned refractive index variations comprises a first characteristic dimension and a second characteristic dimension distinct from the first characteristic dimension.

4. The photonic material of claim 1, wherein the photopolymer section comprises a photo-responsive elastomer.

5. The photonic material of claim 1, wherein the backing layer comprises silicone.

6. The photonic material of claim 1, wherein the backing layer comprises an elastomer.

7. The photonic material of claim 1, wherein the backing layer comprises silicone, polyurethane, natural polyisoprene, and/or synthetic polyisoprene.

8. The photonic material of claim 1, wherein the photonic material is capable of generating a color pattern or image in the photonic material.

9. The photonic material of claim 1, wherein the photonic material exhibits specular reflectance and/or diffuse reflectance.

10. The photonic material of claim 1, wherein spatially incoherent light is used to generate a standing wave patten in the photopolymer section.

11. The photonic material of claim 1, wherein the plurality of optically-patterned refractive index variations comprises two or more sets of refractive index variations.

12. The photonic material of claim 1, comprising a plurality of refractive index variations within a first region of the photonic material and a different plurality of refractive index variations within a second region of the photonic material.

13. The photonic material of claim 1, incorporated into clothing or another wearable article.

14. A method for making a photonic material comprising a photopolymer section comprising a plurality of optically-patterned refractive index variations, wherein the photonic material exhibits reversible color variation under applied mechanical strain, comprising:
  applying light to a photopolymer section comprising a photo-responsive elastomer and associated with a reflection layer having a textured surface;
  forming a plurality of optically-patterned refractive index variations in the photo-responsive elastomer; and
  removing the associated reflection layer from the photopolymer section.

15. The method of claim 14, further comprising applying a backing layer to the photopolymer section after removing the photopolymer section from the reflection layer.

16. The method of claim 15, wherein the backing layer has an elastic modulus 1.1 times greater than the photopolymer section.

17. The method of claim 14, wherein forming the plurality of optically-patterned refractive index variations in the photo-responsive elastomer comprises forming a first set of optically-patterned refractive index variations in the photo-responsive elastomer and forming a second set of optically-patterned refractive index variations in the photo-responsive elastomer distinct from the first set of optically-patterned refractive index variations in the photo-responsive elastomer.

18. The method of claim 14, wherein the plurality of optically-patterned refractive index variations formed in the photo-responsive elastomer comprises a first characteristic dimension and a second characteristic dimension distinct from the first characteristic dimension.

19. The method of claim 14, wherein the plurality of optically-patterned refractive index variations has periodic spacings of less than 1 µm.

20. The method of claim 14, wherein a period of the optically-patterned refractive index variations is less than 1 µm and greater than or equal to 100 nm.

21. The method of claim 14, wherein the reflection layer has an RMS surface roughness of greater than or equal to 1 nm.

* * * * *